United States Patent [19]

Wu

[11] Patent Number: 5,033,994
[45] Date of Patent: Jul. 23, 1991

[54] APPARATUS FOR PROVIDING AN AUTOMATIC TRANSMISSION

[76] Inventor: Cheng H. Wu, 2 Fl., No. 24, Lane 430, Fu Hsing N. Rd., Taipei, Taiwan

[21] Appl. No.: 636,010

[22] Filed: Jan. 4, 1991

Related U.S. Application Data

[63] Continuation of Ser. No. 385,533, Jul. 26, 1989, abandoned.

[51] Int. Cl.$^5$ .............................................. F16H 47/04
[52] U.S. Cl. ....................................... 475/73; 475/75; 475/76; 475/80; 475/317; 475/323
[58] Field of Search ........................ 475/72, 73, 75, 76, 475/78, 82, 93, 94, 97, 99, 104, 107, 115, 80, 317, 323

[56]  References Cited
U.S. PATENT DOCUMENTS

| | | | |
|---|---|---|---|
| 3,184,913 | 5/1965 | Anderson et al. | 475/75 X |
| 3,505,908 | 4/1970 | Herrmann | 475/94 |
| 3,969,975 | 7/1976 | DeLalio | 475/76 X |
| 4,185,521 | 1/1980 | Beals | 475/76 X |
| 4,354,400 | 10/1982 | Baker | 475/75 X |
| 4,429,593 | 2/1984 | Michael | 475/82 |
| 4,434,972 | 3/1984 | Charles | 475/73 X |
| 4,446,756 | 5/1984 | Hagin et al. | 475/75 |

Primary Examiner—Allan D. Herrmann
Assistant Examiner—Benjamin Levi
Attorney, Agent, or Firm—Morton J. Rosenberg; David I. Klein

[57] ABSTRACT

An apparatus for providing an automatic transmission, including at least one planetary gear, at least one braking pump, at least one flow control valve and an oil path system provided therebetween for obtaining a continuously variable transmission (CVT). Each braking member of at least one planetary gear of the present invention is connected to each rotor shaft of at least one braking pump. A sensing means is provided for sensing a rotation speed of a rear propeller shaft and to output predetermined amounts of pressurized working fluid in response to the rotation speed of the rear propeller shaft. A first flow control valve provided on an oil path system is controlled by the pressurized working fluid to be closed to various extents so as to reduce the flow within the oil path system. The rotation speed of at least one braking pump together with each braking member is also reduced, on extreme conditions the pumps even stop. The planetary gear obtains a reaction force therebetween and obtains a desired torque for transmission.

31 Claims, 31 Drawing Sheets

_FIG._1_

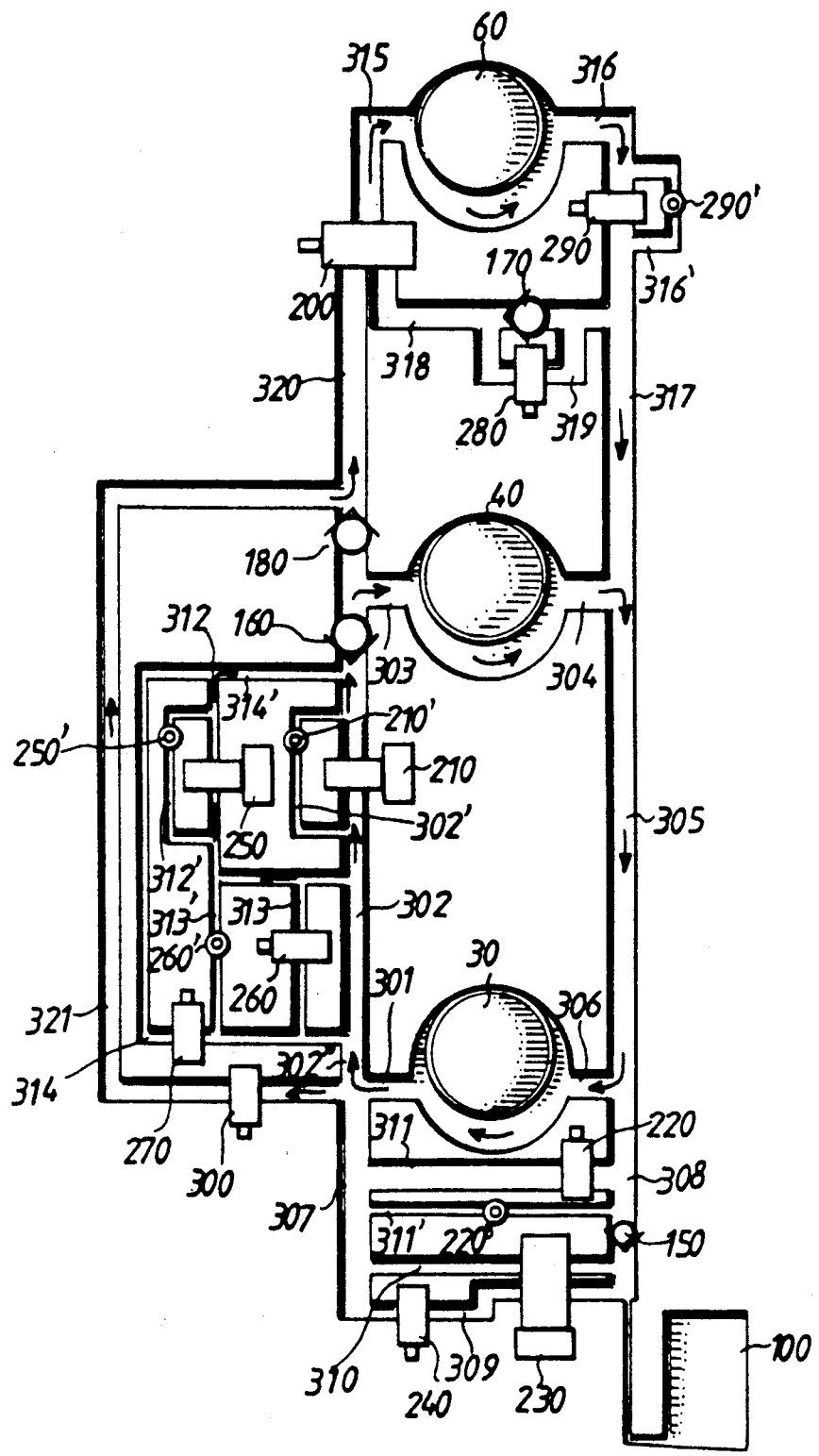
FIG._4E_

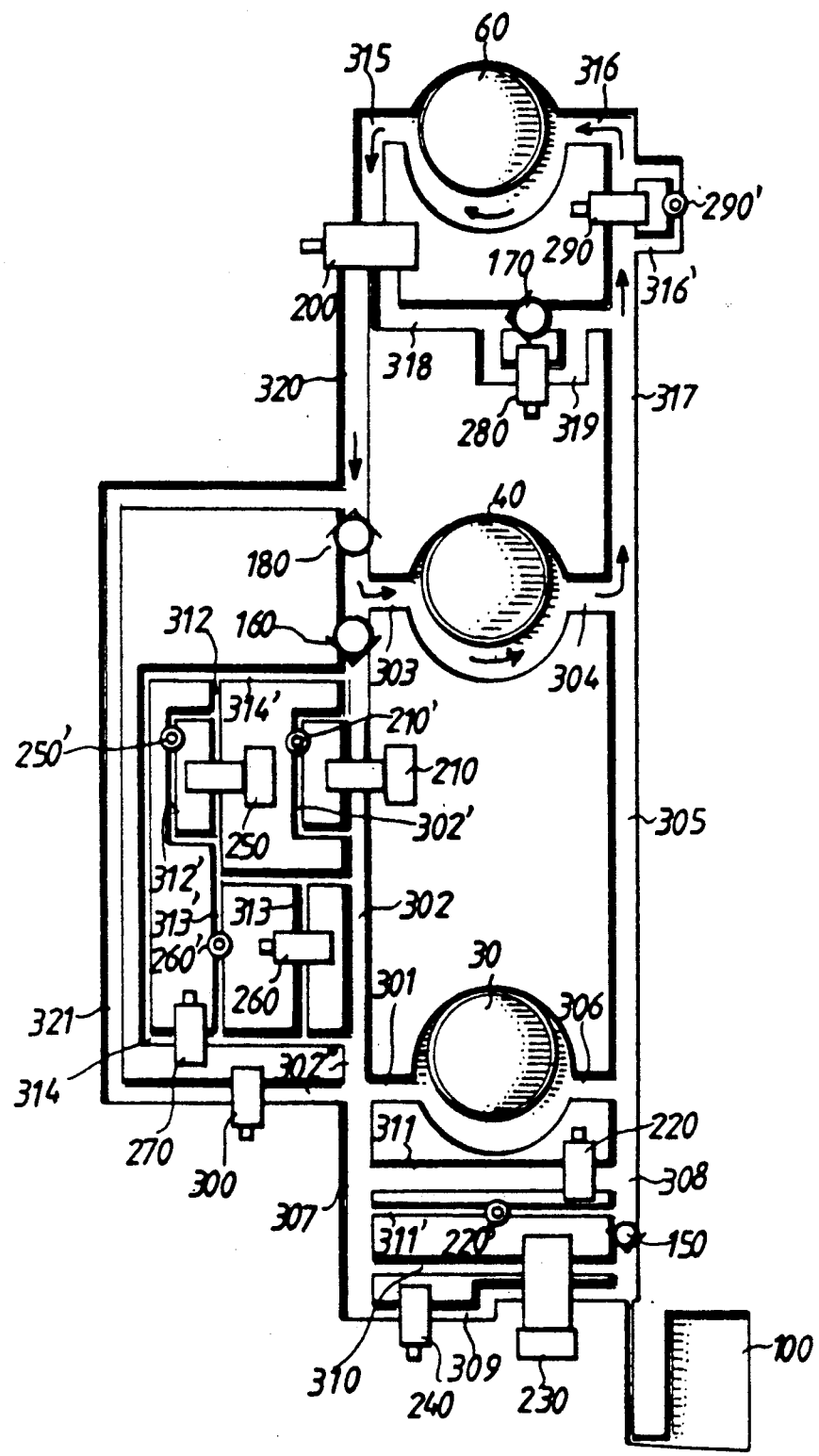
FIG._4F_

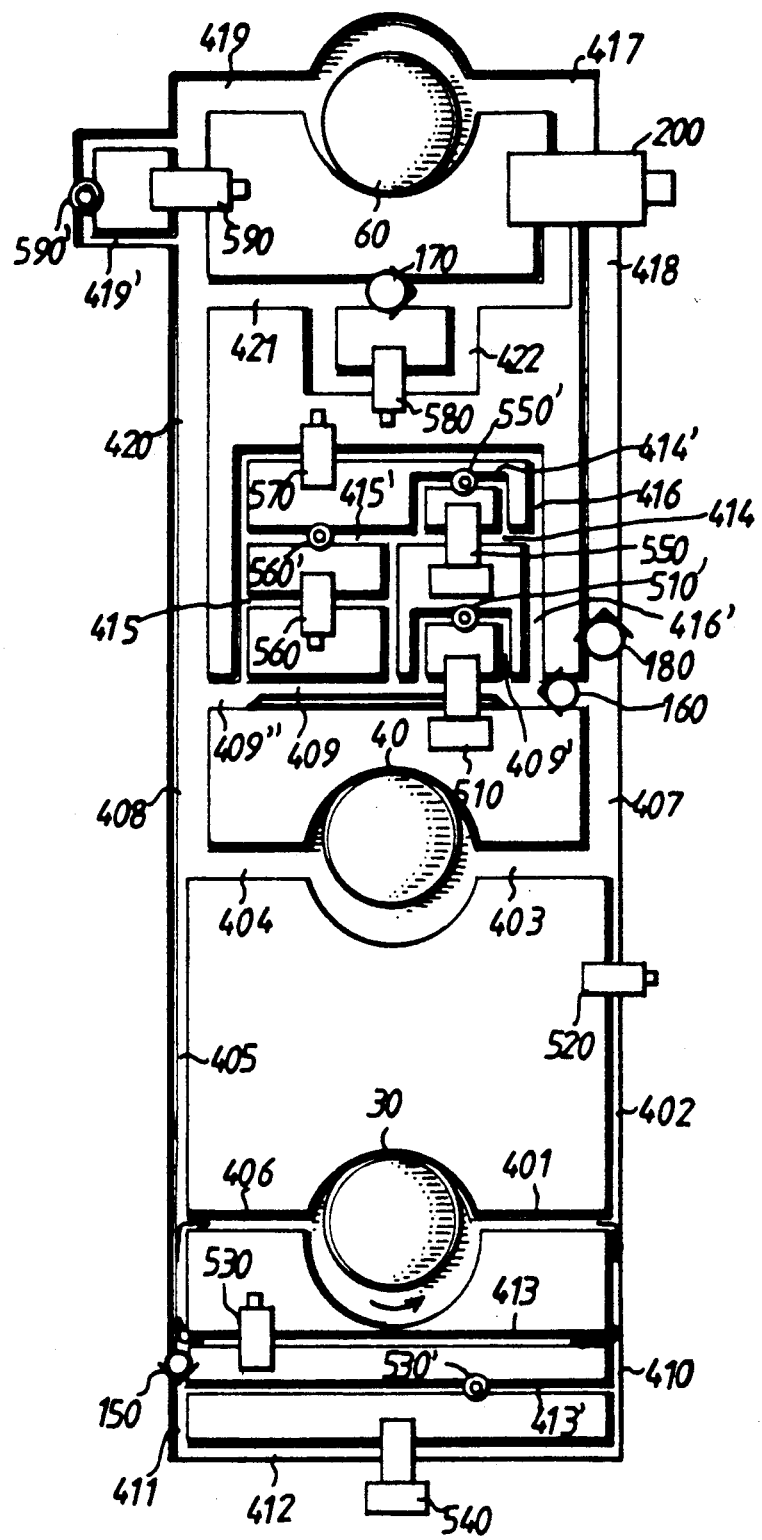
FIG_5A

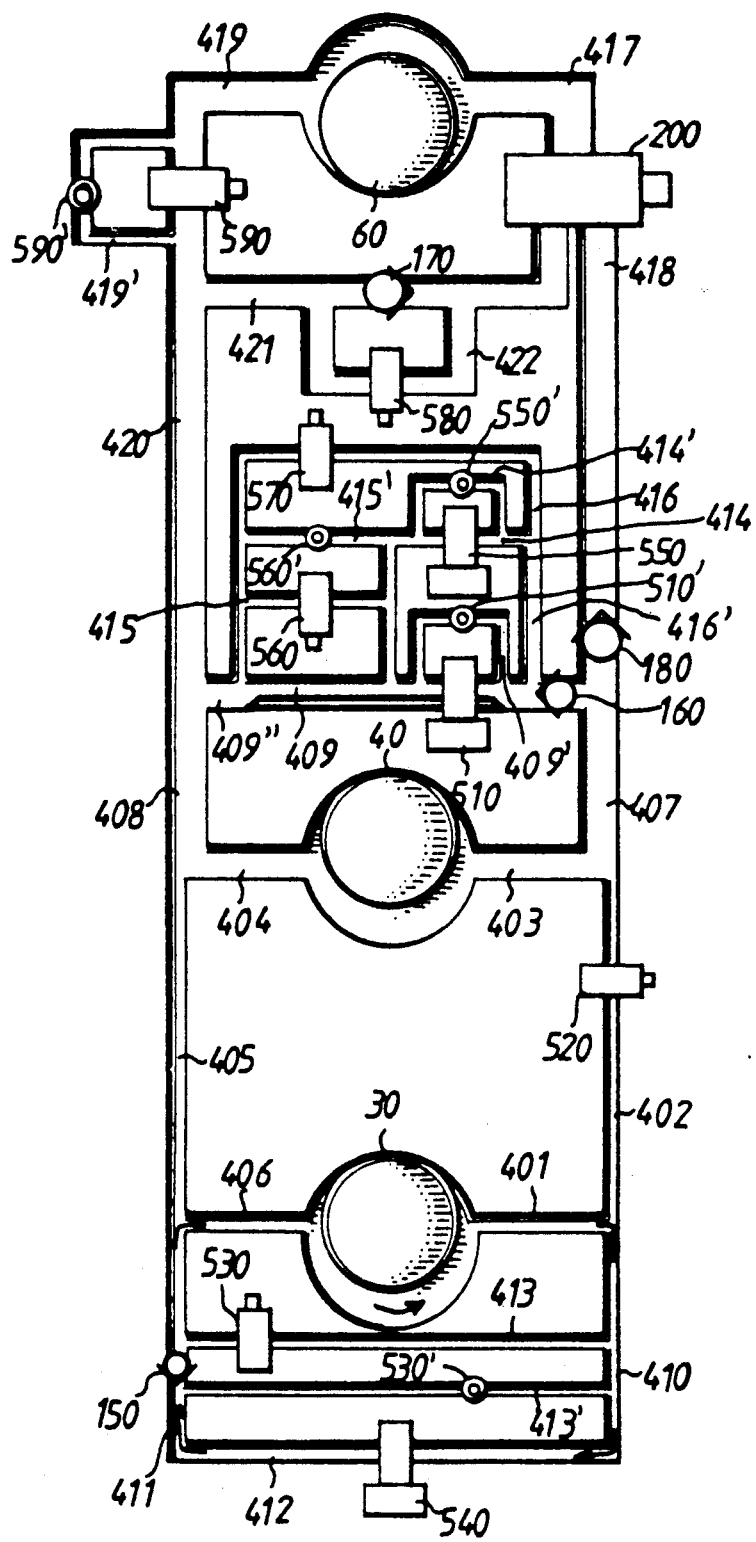
FIG_5B_

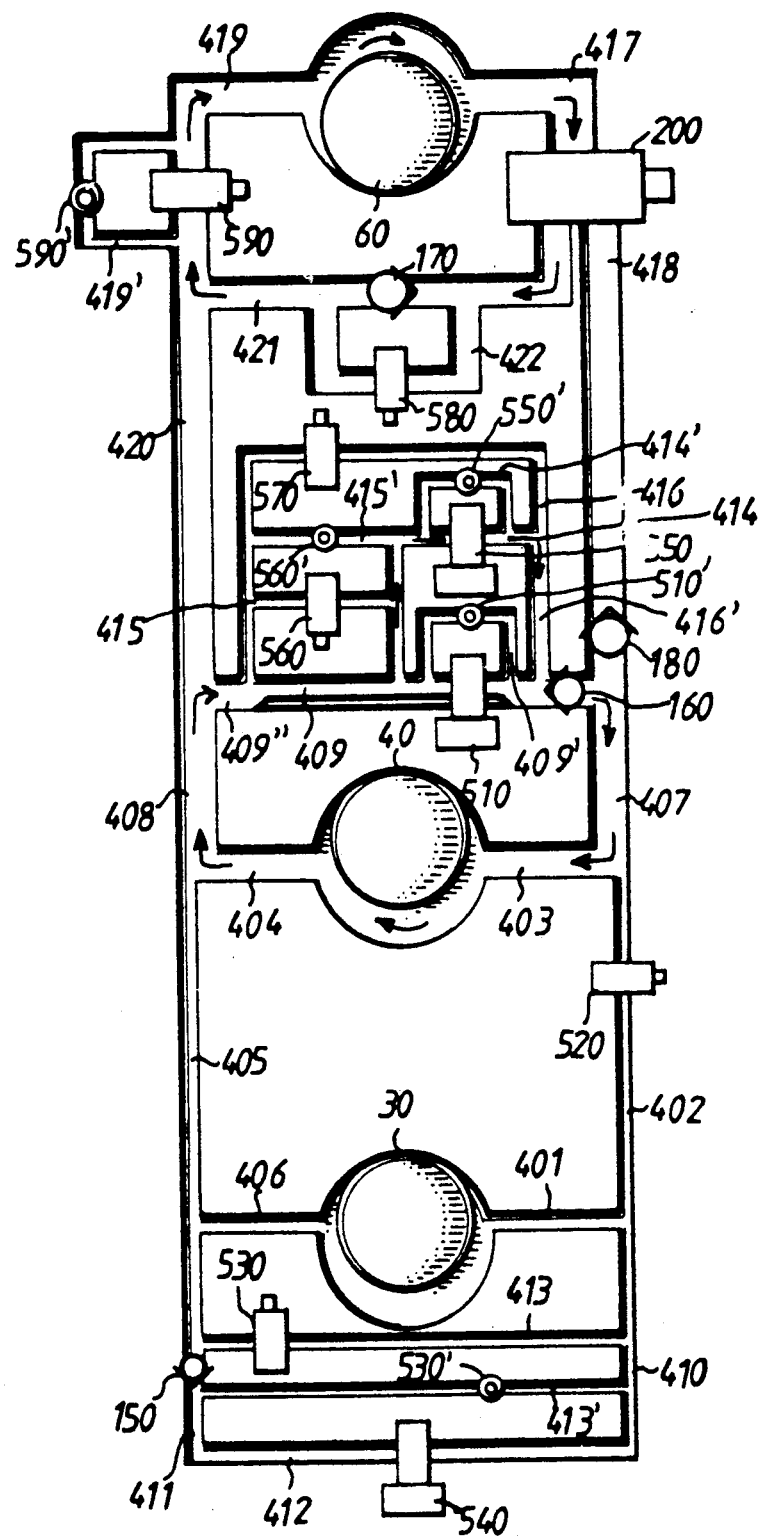
FIG_5C_

APPARATUS FOR PROVIDING AN AUTOMATIC TRANSMISSION

This is a continuation of copending application Ser. No. 07/385,533 filed on July 26, 1989, now abandoned.

BACKGROUND OF THE INVENTION

The present invention relates to an apparatus for providing an automatic transmission, and especially to an apparatus comprising at least one planetary gear, at least one braking pump, at least one flow control valve and an oil path system provided therebetween to obtain a continuously variable transmission (CVT).

Conventionally, the rotation speeds of oil pumps used for automatic transmission increase in proportion to the increase of the rotation speed of the rear propeller shaft. As is a widely known fact, the oil pumps consumes a portion of energy. In addition, the mechanical parts of the oil pumps are easily damaged and abraded. Furthermore, the fuel consumption rate of a car with an automatic transmission is higher than a car with a manual transmission.

The present invention provides an apparatus having specially-constructed planetary gears with a special transmission relationship to resolve the disadvantages existing in an automatic transmission.

SUMMARY OF THE INVENTION

It is an object of the present invention to provide an apparatus having at least one planetary gear for an automatic transmission.

It is another object of the present invention to provide oil pumps having low rotation speeds to brake the braking gear of at least one planetary gear to obtain the required transmission power.

It is still another object of the present invention to provide durable oil pumps in an apparatus for continuously variable transmission, wherein the rotation speeds of the oil pump decrease as the rotation speed of the rear propeller shaft increases, such that under extreme conditions, the oil pumps stop.

It is yet another object of the present invention to provide an apparatus for an automatic transmission which has a lower fuel consumption rate than conventional automatic transmissions.

It is still another object of the present invention to provide a centrifugal pump to sense the rotation speed of a rear propeller shaft and at least one flow control valve is provided to control the rotation speeds of the oil pumps to brake the braking gear of at least one planetary gear in order to obtain a gear reduction ratio for continuously variable transmission.

These and additional objects, if not set forth specifically herein, will be readily apparent to those skilled in the art from the detailed description provided hereinbelow, with appropriate reference to the accompanying drawings.

BRIEF DESCRIPTION OF THE DRAWINGS

FIG. 4D is a schematic view of the oil system of FIG. 4A, wherein the arrows show the path of the working fluid when the shifting lever is at a reversing position under an engine idling condition;

FIG. 4E is a schematic view of the oil system of FIG. 4A, wherein the arrows show the path of the working fluid when the shifting lever is at a reversing position and the accelerator is pressed;

FIG. 4F is a schematic view of the oil system of FIG. 4A, wherein the arrows show the path of the working fluid during engine braking;

FIG. 5A is a schematic view of an oil system of the first embodiment according to the present invention in an economical type control system, wherein the arrows show the path of the working fluid when a shifting lever is at a neutral position;

FIG. 5B is a schematic view of the oil system of FIG. 5A, wherein the arrows show the path of the working fluid when the shifting lever is at a forwarding position under an engine idling condition;

FIG. 5C is a schematic view of the oil system of FIG. 5A, wherein the arrows show the path of the working fluid when the shifting lever is at a forwarding position and the accelerator is pressed;

FIG. 5D is a schematic view of the oil system of FIG. 5A, wherein the arrows show the path of the working fluid when the shifting lever is at a reversing position under engine idling condition;

FIG. 6D is a schematic view of the oil system of FIG. 6A, wherein the arrows show the path of the working fluid when the shifting lever is at a reversing position when an engine idling condition;

DETAILED DESCRIPTION OF THE PREFERRED EMBODIMENT

1. Introduction

Figure 1:
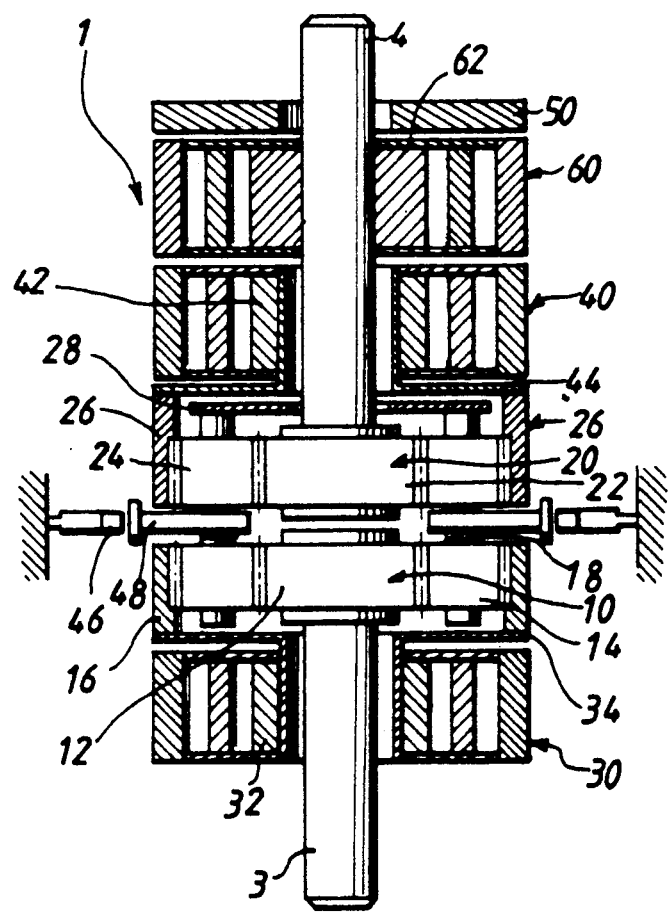
FIG. 1 is a cross-sectional view of a first embodiment of an apparatus for automatic transmission in accordance with the present invention.

As generally known for a planetary, if neither the sun gear, the planet carrier nor the ring gear of a planetary gear are fixed, there will always be free rotation within the planetary gear and no gear reduction ratio for transmission can be obtained. Further to the disadvantages of conventional automatic transmissions, the present invention provides and an apparatus for automatic transmission.

In the case of sun gear, planet carrier and ring gear of a planetary gear of the present invention, the gear receiving the transmission of external power is called a driving member, the gear being braked resulting in a reduction in the rotation speed thereof is called a braking member, the remaining one is called a driven member.

Each braking member of at least one planetary gear of the present invention is connected to each rotor shaft of at least one braking pump. The present invention further utilizes s sensing means to sense a rotation speed of a rear propeller shaft and to output various amounts of pressurized working fluid in response to the rotation speed of the rear propeller shaft. A first flow control valve provided on an oil path system is controlled by the pressurized working fluid to be closed to various extents so as to reduce the flow within the oil path system. The rotation speed of at least one braking pump together with each braking member is also reduced, on extreme condition the pumps even stops. The planetary gear obtains a reaction force therebetween and obtains a desired torque for transmission. Accordingly, a continuously variable transmission is obtained.

The apparatus for an automatic transmission in accordance with the present invention comprises a first planetary gear and a second planetary gear, a first braking pump and a second braking pump, a sensing means, an oil path system and a first flow control valve provided on the oil path system. Each of the first and second planetary gears has a sun gear, a planet carrier and a ring gear which are respectively accommodated to function as either a driving member, a driven member or a braking member within the first planetary gear and the second planetary gear. A driven gear in the second planetary gear relates to a corresponding driving member in the first planetary gear. A driving member in the second planetary gear relates to a corresponding driven member in the first planetary member. A braking member in the second planetary gear relates to a corresponding braking member in the first planetary gear.

The driving member of the first planetary gear is mounted on an engine crankshaft and the driven member of the second planetary gear is mounted on the rear propeller shaft. A first shaft of the first braking pump is connected to the braking member of the first planetary gear. A second rotor shaft of the second braking pump is connected to the braking member of the second planetary gear. Both the first braking pump and the second braking pump are communicated to the oil path system and are controlled by the sensing means.

The sensing means is mounted on the rear propeller shaft for sensing the rotation speed of the rear propeller shaft and outputs various amounts of pressurized working fluid in response to the rotation speed of the rear propeller shaft to close a first flow control valve so as to brake the first and the second braking pumps via the oil path system. The braking gears of the first and the second planetary members are braked by the first and the second braking pumps and a continuously variable transmission is obtained.

2. First Embodiment in Standard Control Type

Referring to FIG. 1, a first embodiment according to the present invention is shown. FIGS. 3A to 3F show an oil path system of a standard control type of the first embodiment. In the first planetary gear 10, the sun gear 12 functions as a driving member, the planet carrier 28 functions as a driven member, the ring gear 16 functions as a braking member. In the second planetary gear 20, the sun gear 22 functions as a driven member, the planet carrier 28 functions as a driving member, the ring gear 26 functions as a braking member.

A planet pinion 14 of the first planetary gear 10 shares a planet pinion shaft 18 and a planet carrier 28 with a planet pinion 24 of the second planetary gear 20. The sun gear 12 of the first planetary gear 10 is mounted on an engine crankshaft 3. The ring gear 16 of the first planetary gear 10 is connected to a rotor shaft 32 of the first braking pump 30 via a first ring gear carrier 34. The ring gear 26 of the second planetary gear 20 is connected to a rotor shaft 42 of the second braking pump 40 via a second ring gear carrier 44. The sun gear 22 of second planetary gear 20 is mounted on the rear propeller shaft 4. A centrifugal oil pump 50 is provided on the rear propeller shaft 4 for sensing the rotation speed of the rear propeller shaft 4 and functions as the sensing means.

A first end of a first oil path 301 is communicated to an outlet of the first braking pump 30. A first end of a second oil path 302 is communicated to a second end of the first oil path 301. A first end of a third oil path 303 is communicated to a second end of the second oil path 302. A second end of the third oil path 303 is communicated to an inlet of the second braking pump 40. A first end of a fourth oil path 304 is communicated to an outlet of the second braking pump 40. A first end of a fifth oil path 305 is communicated to a second end of the fourth oil path 304. A first end of a sixth oil path 306 is communicated to a second end of the fifth oil path 305. A second end of the sixth oil path 306 is communicated to an inlet of the first braking pump 30.

Figure 7:
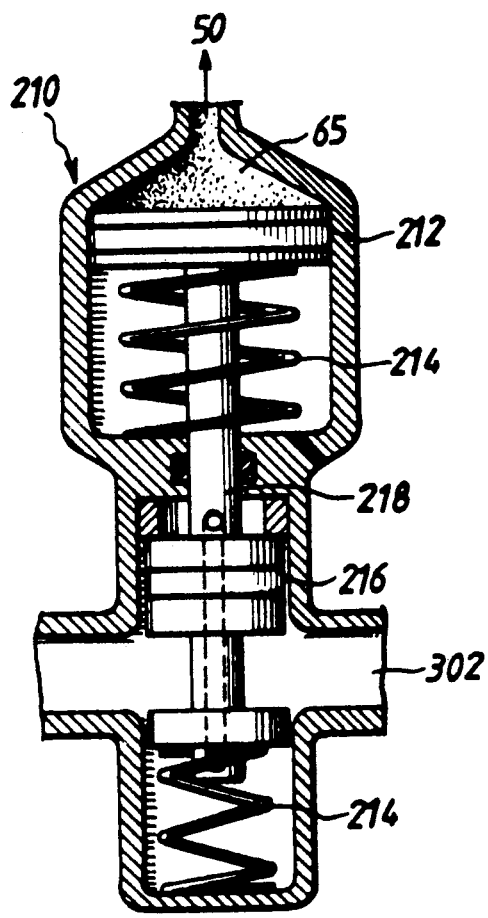
FIG. 7 is a cross-sectional view of a flow control valve according to the present invention.

Referring to FIG. 7, a first flow control valve 210 is provided on the second oil path 302. The first flow control valve is communicated to the centrifugal oil pump 50 at one end thereof. When the centrifugal oil pump 50 outputs pressurized oil 65 in response to the rotation speed of the rear propeller shaft 4, a gate 216 is linked to move downwards to partially close the second oil path 302. The flow in a circuit from the first oil path 301 to the sixth oil path 306 is reduced, the rotation speeds of pumps 30 and 40 and the respective ring gears 16 and 26 are also reduced. The two planetary gears 10 and 20 obtain reaction forces therebetween and obtain the desired gear reduction ratio for transmission.

As the rotation speed of the rear propeller shaft increases, the pressurized oil makes the gate 216 further move downwards, the flow within the circuit mentioned above is further reduced and the ring gears are further braked so as to obtain a lower gear reduction ratio. When the gate 216 completely closes the second oil path 302, the ring gears 16 and 26 are completely braked and the lowest gear reduction ratio is obtained. If the rotation speed of the rear propeller shaft decreases, the pressurized oil can not overcome the force of a spring 214 and the gate 216 is moved upwards. The gear reduction ratio is increased. Therefore, the present invention provides a continuously variable transmission.

A relief valve 210' is provided on a subpipe 302' communicated to the second oil path 302 at two ends thereof in order to reduce the pressure of overpressurized oil as a conventional pressure relief valve. Furthermore, the relief valve 210' provides the functions of automatically reducing the gear reduction ratio and absorbing impacts and shocks when the car is on a rugged road.

Referring to FIGS. 3A to 3F, a first end of a seventh oil path 307 is communicated to the second end of the first oil path 301. A first end of an eighth oil path 308 is communicated to the first end of the sixth oil path 306. A first end and a second end of a ninth oil path 309 are respectively communicated to a second end of the seventh oil path 307 and a second end of the eighth oil path 308. A first end and a second end of a tenth oil path 310 are respectively communicated to the seventh oil path 307 and the eighth oil path 308. A first end and a second end of an eleventh oil path 311 are respectively communicated to the seventh oil path 307 and the eighth oil path 308. The eleventh oil path 311 is closer to the first braking pump 30 than the tenth oil path 310.

A second flow control valve 220 for neutral is provided on the eleventh oil path 311. The second flow control valve 220 is opened when a shifting lever is at a neutral position and closed when the shifting lever is not at the neutral position.

Figure 8:
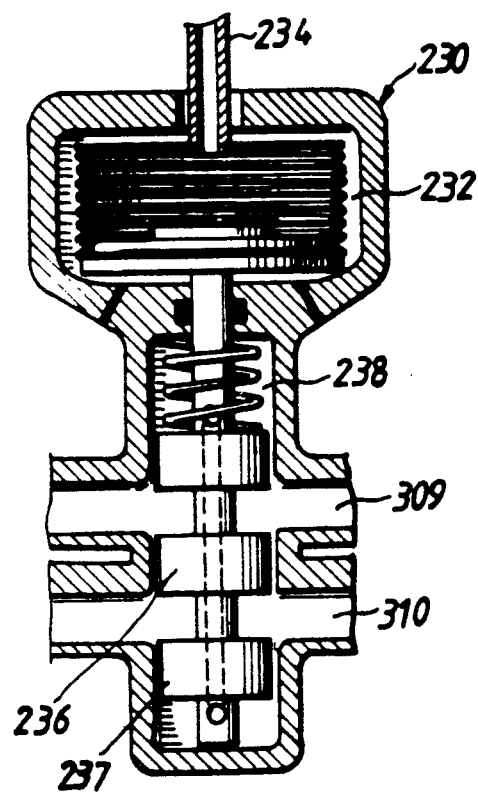
FIG. 8 is a cross-sectional view of another flow control valve provided for engine idling in standard control type.

A third flow control valve 230 is provided on the ninth oil path 309 and the tenth oil path 310. As shown in FIG. 8, the third flow control valve 230 has a gate 236 and a gate 237 to respectively synchronously open or close the ninth oil path 309 and the tenth oil path 310. The third flow control valve 230 is connected to a throttle of an engine via a hollow pipe 234 and senses the rotation speed of idling. When the accelerator is pressed, the degree of a vacuum in a vacuum drum 232 increases proportional to the increase of the rotation speed of the engine. Various degrees of vacuums are generated by the vacuum drum 232 to overcome a spring 238. Gates 236, 237 are simultaneously activated to partially respectively close the ninth oil paths 309 and the tenth oil path 310. When the accelerator is pressed to a pre-determined extent, gates 236 and 237 respectively completely close the ninth oil paths 309 and the tenth oil path 310. When the accelerator is released and the engine is in the idling condition, the vacuum generated by the vacuum drum 232 is insufficient to overcome the spring 238 and gates 236 and 237 are moved to their original positions.

Figure 9:
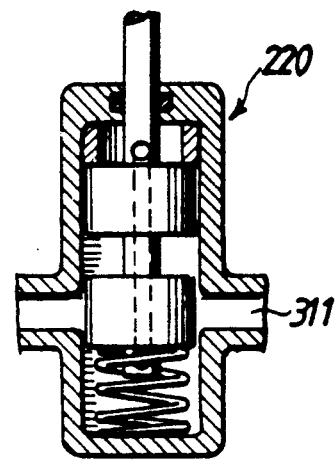
FIG. 9 is a cross-sectional view of a manual flow control valve.

A fourth flow control valve 240 for reversing under an engine idling condition is provided on the ninth oil path 309 between the second end of the seventh oil path 307 and the third flow control valve 230. The fourth flow control valve 240 has the same construction as the second flow control valve 220 as shown in FIG. 9. The fourth flow control valve 240 is opened when the shifting lever is at a reversing position, the fourth flow control valve 240 is closed when the shifting lever is not at the reversing position.

Figure 3A:
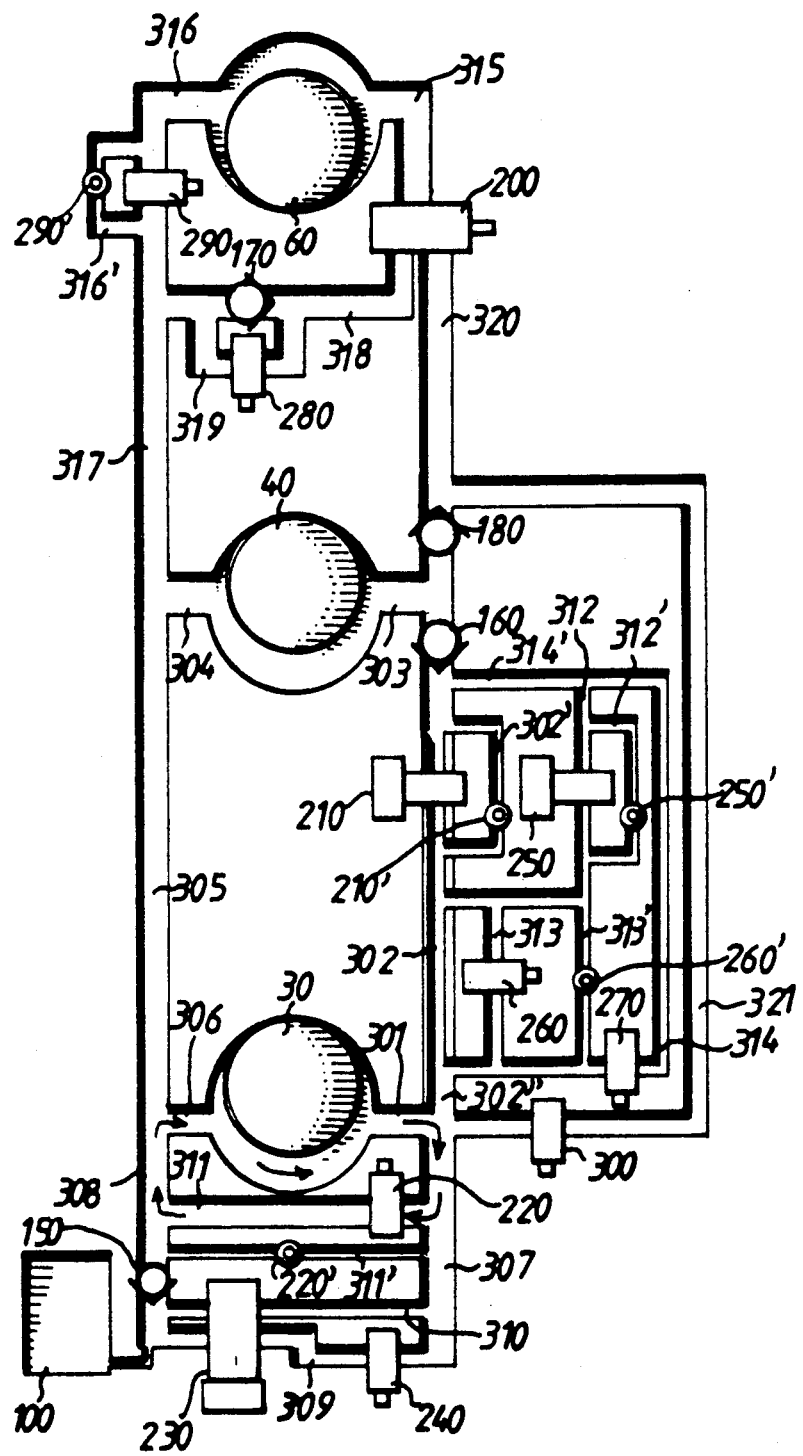
FIG. 3A is a schematic view of an oil system of the first embodiment according to the present invention in a standard type control system, wherein the arrows show the path of the working fluid when a shifting lever is at a neutral position.
Figure 3B:
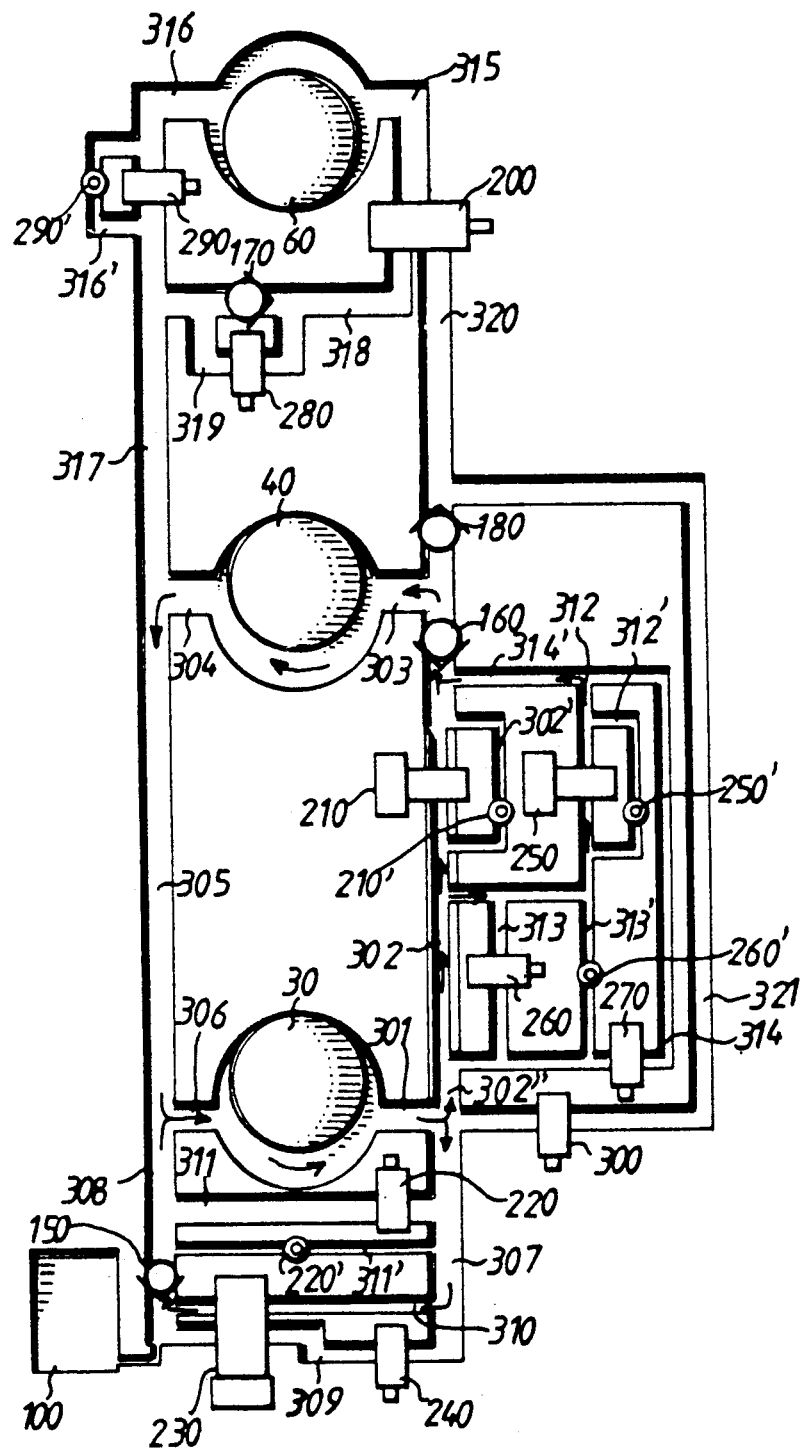
FIG. 3B is a schematic view of the oil system of FIG. 3A, wherein the arrows show the path of the working fluid when the shifting lever is at a forwarding position under an engine idling condition (the accelerator is not pressed)

As shown in FIG. 3B, when the shifting lever is at a forwarding position and the accelerator is not pressed but the engine is under a higher idling rotation speed, half of the flow from pump 30 flows back to pump 30 via oil path 311, the other half of the flow from pump 30 flows back to pump 30 via a first oil circuit consisting of respectively oil paths 310, 302, 303, pump 40, oil paths 304, 305, and 306 as indicated by the arrows in FIG. 3B.

When the shifting lever is at the forwarding position and the accelerator is pressed and the critical point of free rotation is passed and effective driving begins. When the accelerator is pressed to a pre-determined extent, the third control valve 230 is completely closed and the flow from pump 30 circles back to pump 30 via the first oil circuit mentioned above as shown in the arrows in FIG. 3C. When the accelerator is pressed to a pre-determined extent to completely close the control valve 210, there are no oil circuits within the first oil circuit and the ring gears 16 and 26 are completely braked.

In order to obtain an instant response when the accelerator is pressed such as for a manual transmission, valve 230 is designed such that when the engine is at a lower idling rotation speed, the gates of valve 230 are completely open. The vacuum drum is unable to overcome the springs therefore the braking pumps and braking gears are not braked. When the engine is at a higher idling rotation speed, if the braking pedal is not pressed, the vacuum drum overcomes the springs and the gates of valve 230 are partially closed and the braking gears and braking pumps are partially braked. Therefore, the car coasts as a conventional automatic transmission when the braking pedal is not pressed. When the braking pedal is pressed or the car is going up a slope, the engine is forced to operate under the lower idling rotation speed and the car does not coast. As soon as the accelerator is pressed, valve 230 is closed within a few seconds and a gear reduction ratio for starting of about 16:1 down to about 4:1 or 3:1 is obtained.

Figure 3C:
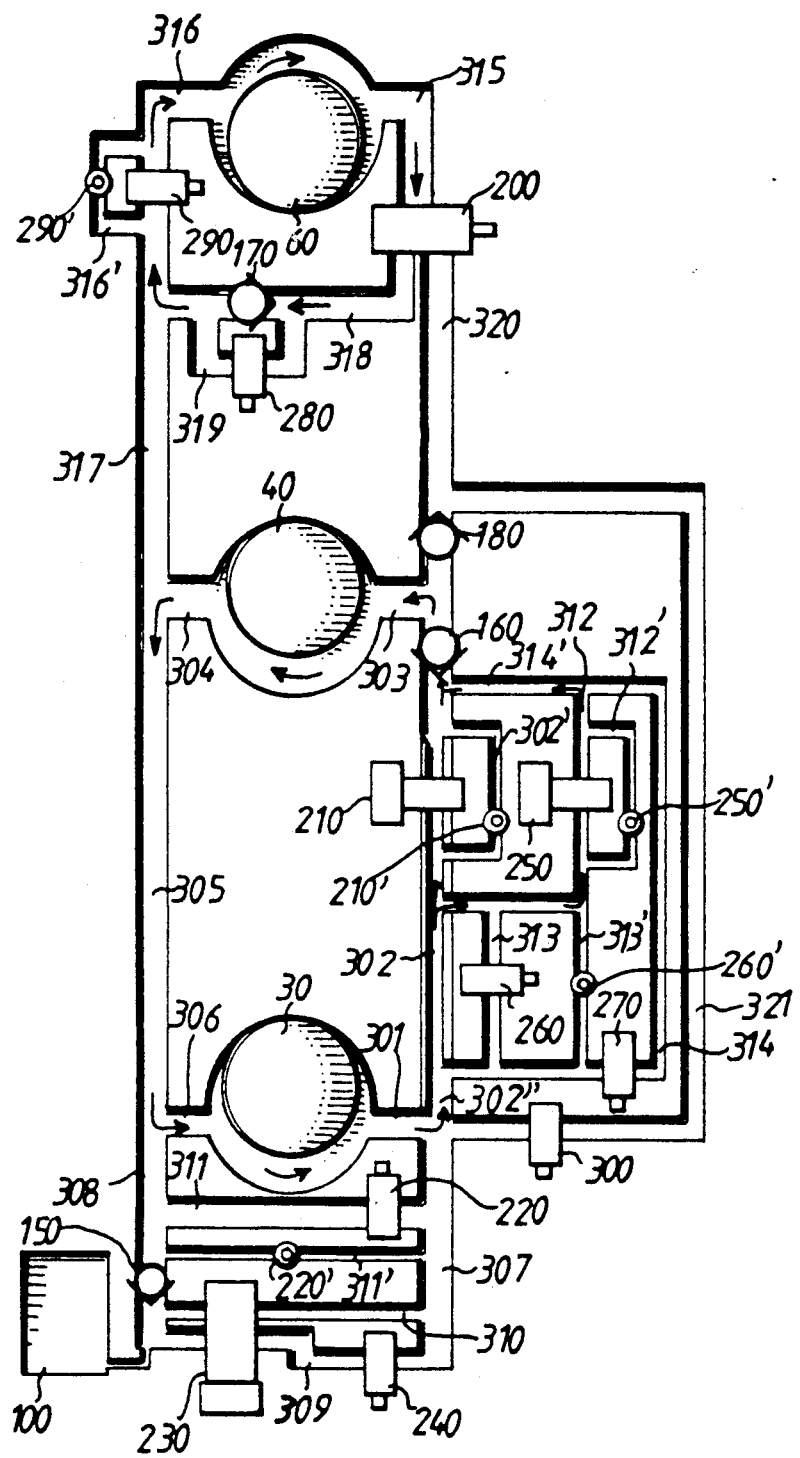
FIG. 3C is a schematic view of the oil system of FIG. 3A, wherein the arrows show the path of the working fluid when the shifting lever is at a forwarding position and the accelerator is pressed.
Figure 3D:
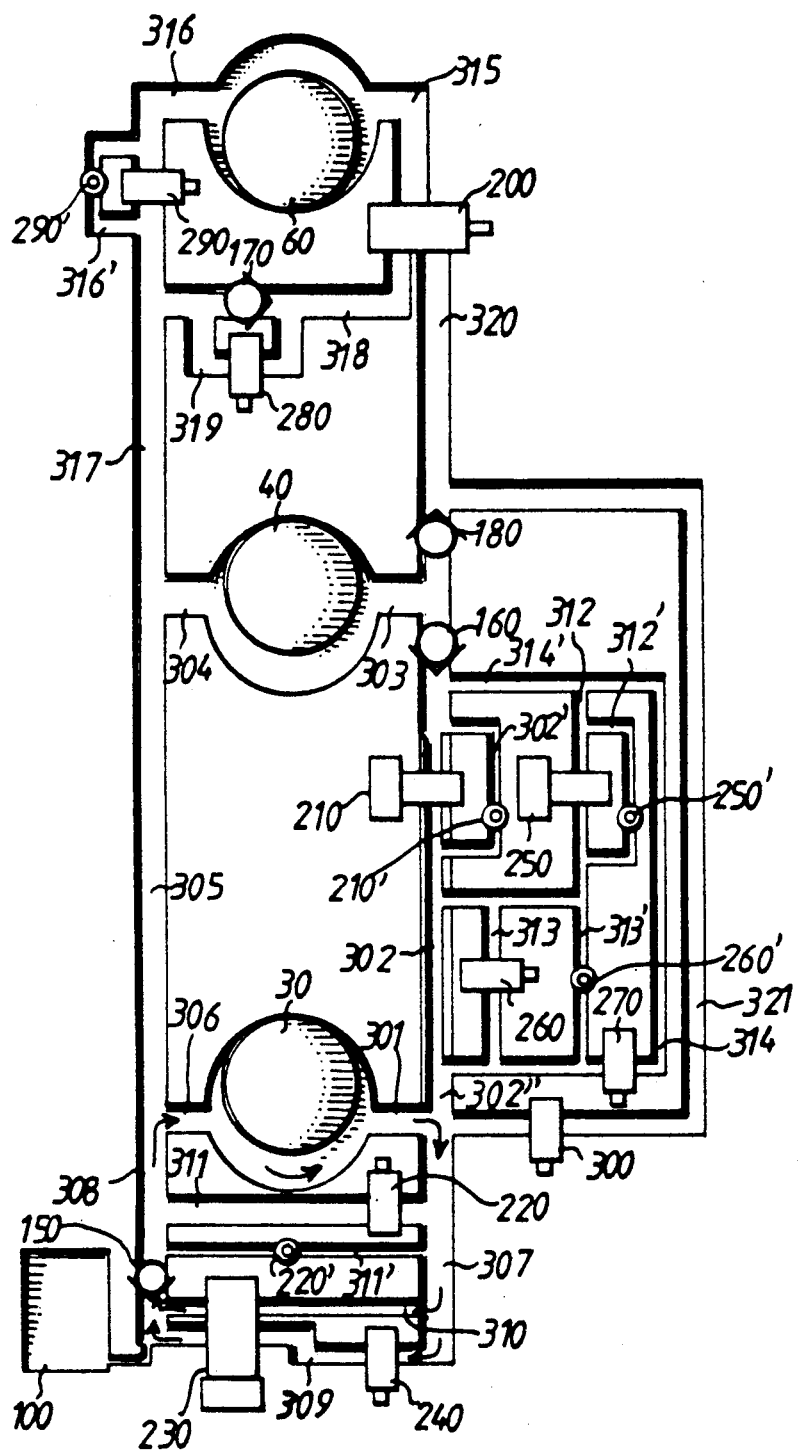
FIG. 3D is a schematic view of the oil system of FIG. 3A, wherein the arrows show the path of the working fluid when the shifting lever is at a reversing position under an engine idling condition.

As shown in FIG. 3D, when the shifting lever is at the reversing position and the accelerator is not pressed, the oil flows from the outlet of pump 30, passes through oil path 307, then half of the flow passes through oil path 309 and another half of the flow passes through oil path 310, then both flows circle back to pump 30 via oil paths 308 and 306 as clearly shown by the arrows in FIG. 3D.

A relief valve 220' is provided on a subpipe 311' communicated to the eleventh oil path 311 at two ends thereof for reducing the pressure of over-pressurized oil. Furthermore, the relief valve 220' provides the functions of automatically reducing the gear reduction ratio and absorbing impacts and shocks when the car is on a rugged road.

A check valve 150 is provided on the eighth oil path 308 between an intersection of oil path 308 and oil path 310 and an intersection of oil path 308 and oil path 309 to prevent any reverse flow of oil. When the car moves at a speed below 20 Km/hr, if the driver does not operate the accelerator, check valve 150 automatically locks pump 30 completely. Furthermore, when the car is moving at any speed, if the engine suddenly stop igniting, check valve 150 makes the engine keep functioning to obtain an inertia starting.

The present invention further comprises a fifth flow control valve 250 for overdrive. The fifth flow control valve 250 is provided on a twelfth oil path 312 communicated to the second oil path 302 at two ends thereof. The fifth flow control valve 250 is communicated to the centrifugal oil pump 50 at one end thereof. The control valve 250 has the same construction as the first control valve 210 and functions as the first flow control valve 210. The fifth flow control valve 250 starts to function only when the car has reached a pre-set overdrive speed. Before the overdrive occurs, the control valve 250 does not close. The present invention further comprises a sixth flow control valve 260 for economical starting. The sixth flow control valve 260 is provided on a thirteenth oil path 313 communicated to the second oil path 302 at two ends thereof. When an economical starting is desired, valve 260 is closed to reduce the amount of oil flowing from pump 30 to pump 40. A relief valve 260' is provided on a subpipe 313' which is communicated to oil path 313 at two ends thereof for reducing the pressure of over-pressurized oil.

A seventh flow control valve 270 is provided on a fourteenth oil path 314 for lowering the gear reduction ratio under urgent conditions. Control valve 270 has the same construction as the second flow control valve 220 as shown in FIG. 9. The fourteenth oil path 314 is communicated to said second oil path 302 at two ends thereof. When a lowering of the gear reduction ratio is needed, such as when overtaking another car, when the car is heavily-loaded and is going up a slope or when the car encounters a strong wind and it is hard to accelerate, the seventh flow control valve 270 is manually opened to allow additional oil flows via oil path 314 in order to accelerate pump 40. The torque for transmission is increased since the braking extent of the ring gears 16 and 26 is reduced.

The present invention further comprises a securing oil pump 60 for engine braking. Pump 60 is mounted on the rear propeller shaft 4 by a rotor shaft 62 thereof. A first end of a fifteenth oil path 315 is communicated to a first end of the securing oil pump 60. A second end of the fifteenth oil path 315 is communicated to a first side of a split-directional flow control valve 200. A first end of a sixteenth oil path 316 is communicated to a second end of the securing oil pump 60. A second end of the sixteenth oil path 316 is communicated to a first end of a seventeenth oil path 317. A second end of the seventeenth oil path 317 is communicated to the second end of the fourth oil path 304.

A first end of an eighteenth oil path 318 is communicated to a second side of the split-directional flow control valve 200. A second end of the eighteenth oil path 318 is communicated to a second end of the sixteenth oil path 316. A nineteenth oil path 319 is communicated to the eighteenth oil path 318 at two ends thereof. A first end of a twentieth oil path 320 is communicated to the second side of the split-directional flow control valve 200. A second end of the twentieth oil path 320 is communicated to the first end of the third oil path 303.

An eighth flow control valve 280 is provided on the nineteenth oil path 319. The eighth flow control valve 280 is opened when the shifting lever is at the neutral position. The eighth flow control valve 280 is closed when the shifting lever is not at the neutral position.

A check valve 170 is provided on the eighteenth oil path 318 between the two ends of the nineteenth oil path 319. The flow within the eighteenth oil path 318 is restrained so that the working fluid is only flowable from the first end of the eighteenth oil path 318 to the second end of the eighteenth oil path 318. Furthermore, when the car rests on a slope before ascending, check valve 170 provides a braking effect to prevent the car sliding down the slope.

A ninth flow control valve 290 is provided on the sixteenth oil path 316 for braking when the braking system can not function properly. Valve 290 has the same construction as the second flow control valve 220 as shown in FIG. 9. Generally, when the braking pedal is pressed, there is a clearance between the braking pedal and the floor of the car in order to avoid the pedal colliding with the floor. If the braking system does not function properly, the braking pedal shall pass over the clearance. The link of the ninth flow control valve 290 connects other elements disposed below the pedal in order that the flow control valve 290 might be closed when the braking system does not function properly and the braking pedal is pressed. As can be seen in FIG. 3C, the circuit for oil circling is interrupted and an extra braking effect is achieved.

A relief valve 290' is provided on a sub oil path 316' communicated to the sixteenth oil path 316 at two ends thereof. Furthermore, valve 290' provides the functions of automatically reducing the gear reduction ratio and absorbing impacts and shocks when the car is on a rugged road.

Figure 10:
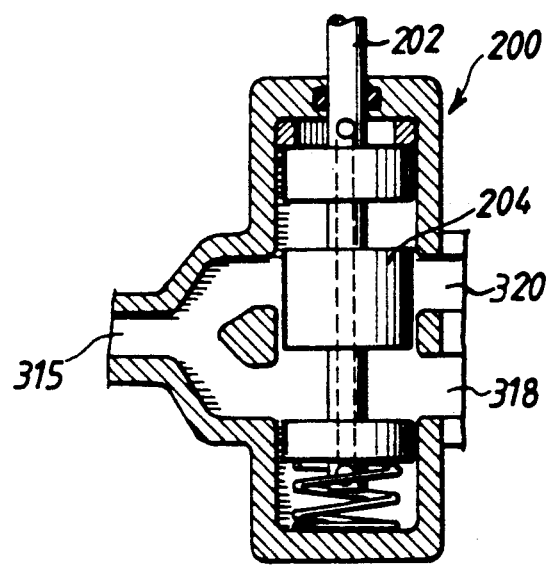
FIG. 10 is a cross-sectional view of a split-directional flow control valve according to the present invention.

Please refer to FIG. 10. The split-directional flow control valve 200 is arranged such that the total amount of flow of the eighteenth oil path 318 and the twentieth oil path 320 is the same as the flow of the fifteenth oil path 315. Gate 204 of valve 200 opens the eighteenth oil path 318 and closes the twentieth oil path 320 when the shifting lever is at a forwarding position. Conversely, gate 204 closes the eighteenth oil path 318 and opens the twentieth oil path 320 when the shifting lever is at a reversing position.

The control valve 200 is manually operated to partially close both the eighteenth oil path and the twentieth oil path for driving at a rated speed and for engine braking when the car is either on a rugged road or the car is heavily loaded on a steep slope or a continuously rise-and-fall slope. For example, if gate 204 opens both oil paths 318 and 320 halfway, half of the oil from pump 60 flows through oil paths 320 and 303, then through pump 40 and oil paths 304, 317 and 316 and circles back to pump 60. Another half of the oil from pump 60 flows through oil paths 318, 319 and 316 and circles back to pump 60.

Generally, a driver utilizes the engine braking when a car is going down a slope. Please refer to FIG. 3F. When the engine braking is needed, valve 200 closes oil path 318 and opens oil path 320. The oil flow from pump 60 flows through oil paths 315, 320, 303, pump 40 and returns to pump 60 via oil paths 304, 317, 316 as indicated by the arrows in FIG. 3F. Since the pump 40 is accelerated, the effect of engine braking is achieved.

Furthermore, if the engine has broken down and it is required to push the car in the reverse direction, valve 200 is manually operable to close oil path 320 and open oil path 318 in order that pump 60 may obtain the desired circuit from oil path 319, in the mean time the shifting lever is at the neutral position.

A check valve 180 is provided on oil path 320 adjacent to the first end of oil path 303 to prevent the oil from oil path 302 flowing through oil path 320. Furthermore, when the car is moving and the accelerator is not operated, check valve 180 provides an effect of automatically locking pump 40. Similarly, a check valve 160 is provided on oil path 303 adjacent to the first end of oil path 303 for preventing the reverse flow of oil. When the car is moving and the accelerator is not operated, check valve 160 provides an effect of automatically locking pumps 30 and 40. An oil tank 100 is provided in a suitable place for supplying oil.

A tenth flow control valve 300 for reversing is provided on a twenty-first oil path 321. A first end of the twenty-first oil path 321 is communicated to a second end of the first oil path 301. A second end of the twenty-first oil path 321 is communicated to the twentieth oil path 320. The tenth flow control valve 300 is opened when the shifting lever is at a reversing position. The tenth flow control valve 300 is closed when the shifting lever is not at a reversing position. Valve 300 has the same construction as the second flow control valve 220 as shown in FIG. 9.

Figure 3E:
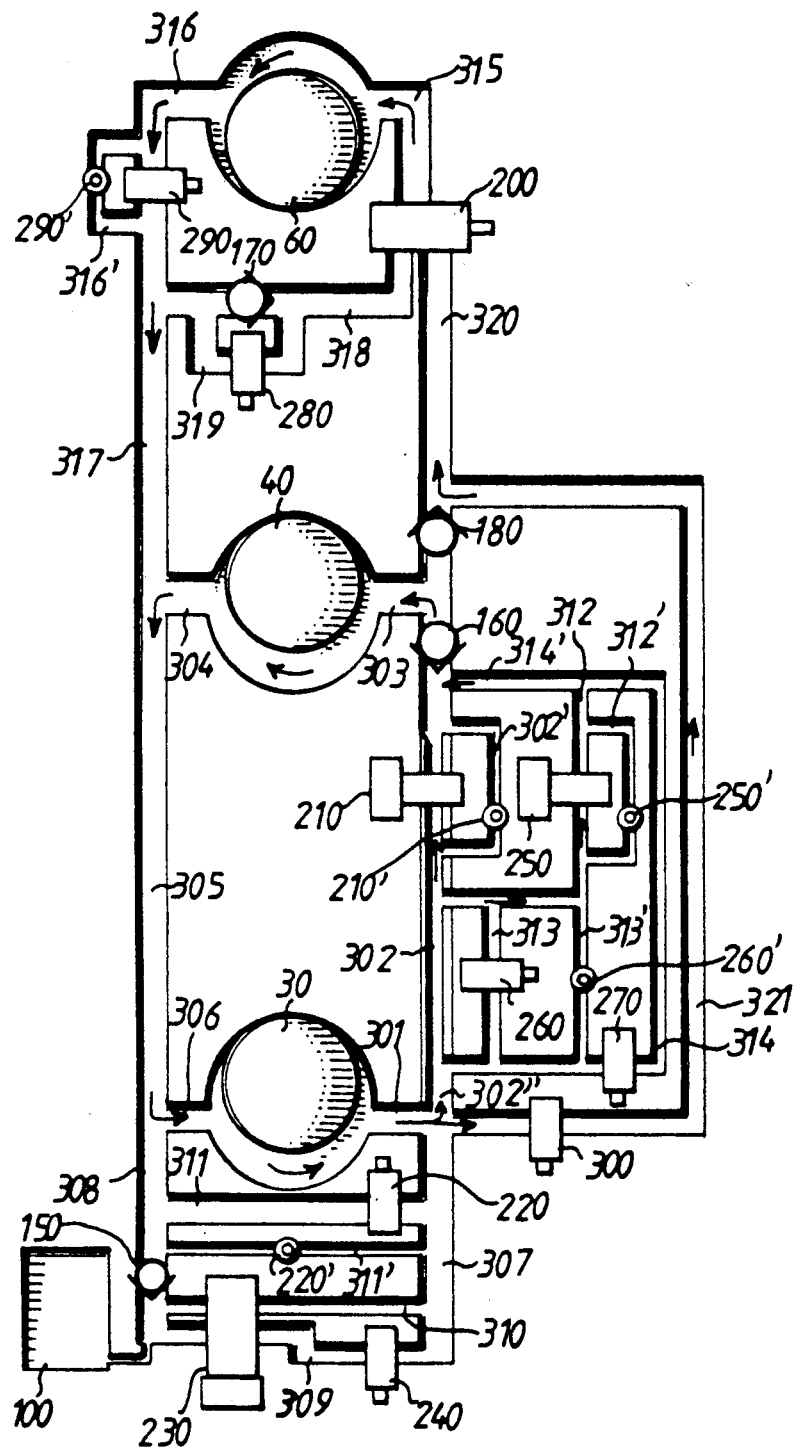
FIG. 3E is a schematic view of the oil system of FIG. 3A, wherein the arrows show the path of the working fluid when the shifting lever is at a reversing position and the accelerator is pressed.

As shown in FIG. 3D, when the shifting lever is at the reversing position and the engine is still idling, the oil flow from pump 30 circles back to pump 30 via oil paths 309 and 310. As shown in FIG. 3E, when the accelerator is pressed to a pre-determined extent and valve 230 is completely closed, one-fourth of the flow from pump 30 flows through oil paths 302 and 303 to pump 40 and returns to pump 30 via oil paths 304, 305 and 306; another three-fourths of the flow from pump 30 flows to pump 60 via oil paths 304, 320 and 315 and returns to pump 30 via oil paths 316, 317, 305 and 306.

A braking annular gear 48 is mounted on the planet pinion shaft 18. The braking annular gear 48 cooperates with a braking claw 46 mounted on an inner wall of the gear box to fix the planet pinion shaft 18 during reversing. The transmission of power between the first planetary gear 10 and the second planetary gear 20 is interrupted and it is completely reliant on the first and the second braking pump 30 and 40 to transmit the power. During reverse, the power from the engine crankshaft 3 is transmitted to the rear propeller shaft 4 via sun gear 12, planet pinion 14, ring gear 16, pump 30, pump 40, ring gear 26, planet pinion 14 and sun gear 22 in sequence.

3. Second Embodiment In Standard Control Type

Figure 2:
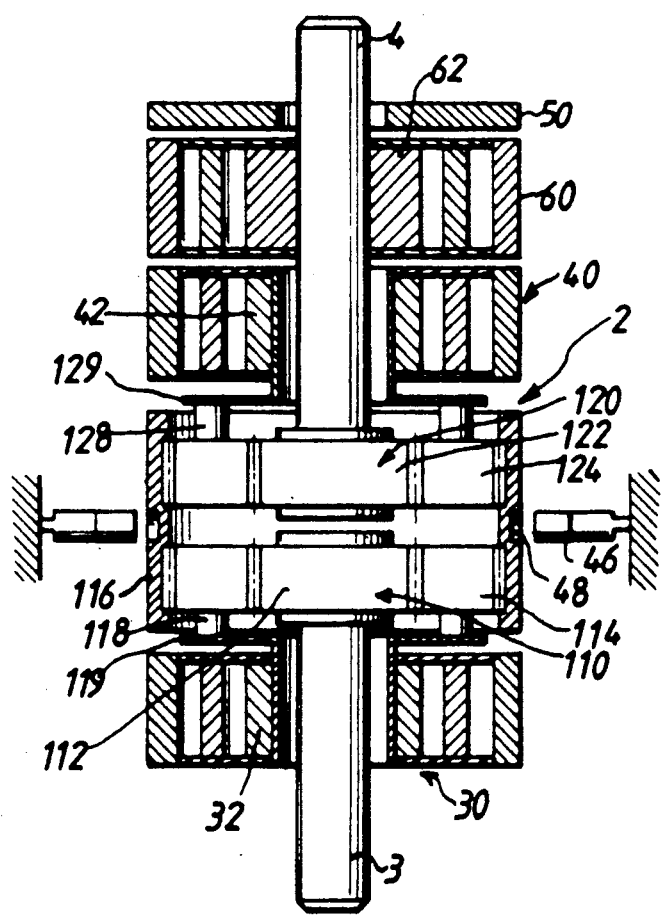
FIG. 2 is a cross-sectional view of a second embodiment of an apparatus for automatic transmission in accordance with the present invention.

Referring to FIG. 2, a second embodiment 2 according to the present invention is shown. In the first planetary gear 110, the sun gear 112 functions as a driving member, the planet carrier 119 functions as a braking member, the ring gear 116 functions as a driven member. In the second planetary gear 120, the sun gear 122 functions as a driven member, the planet carrier 129 functions as a braking member, the ring gear 116 functions as a driving member.

The first planetary gear 110 and the second planetary gear 120 have a common ring gear 116. The sun gear 112 of the first planetary gear 110 is mounted on an engine crankshaft 3. The planet carrier 119 of the first planetary gear 110 is connected to a rotor shaft 32 of the first braking pump 30. The planet carrier 129 of the second planetary gear 120 is connected to a rotor shaft 32 of the second braking pump 40. The sun gear 122 of the second planetary gear 120 is mounted on the rear propeller shaft 4. A centrifugal oil pump 50 is provided on the rear propeller shaft 4 for sensing the rotating speed of the rear propeller shaft 4 and functions as the sensing means.

This embodiment further comprises a braking annular gear 48 mounted on an outer periphery of the ring gear 116. The braking annular gear 48 cooperates with a braking claw 46 mounted on an inner wall of the gear box to fix the ring gear 116 during reversing condition.

Please refer to FIG. 4A to 4F. The oil path system of the second embodiment in standard control system type is the same as the standard control type in the first embodiment 1. Furthermore, the functions and positions of each flow control valve, relief valve and check valve in this standard control type of the second embodiment are the same as the control valves in the standard control type of the first embodiment and need no further description.

Figure 4A:
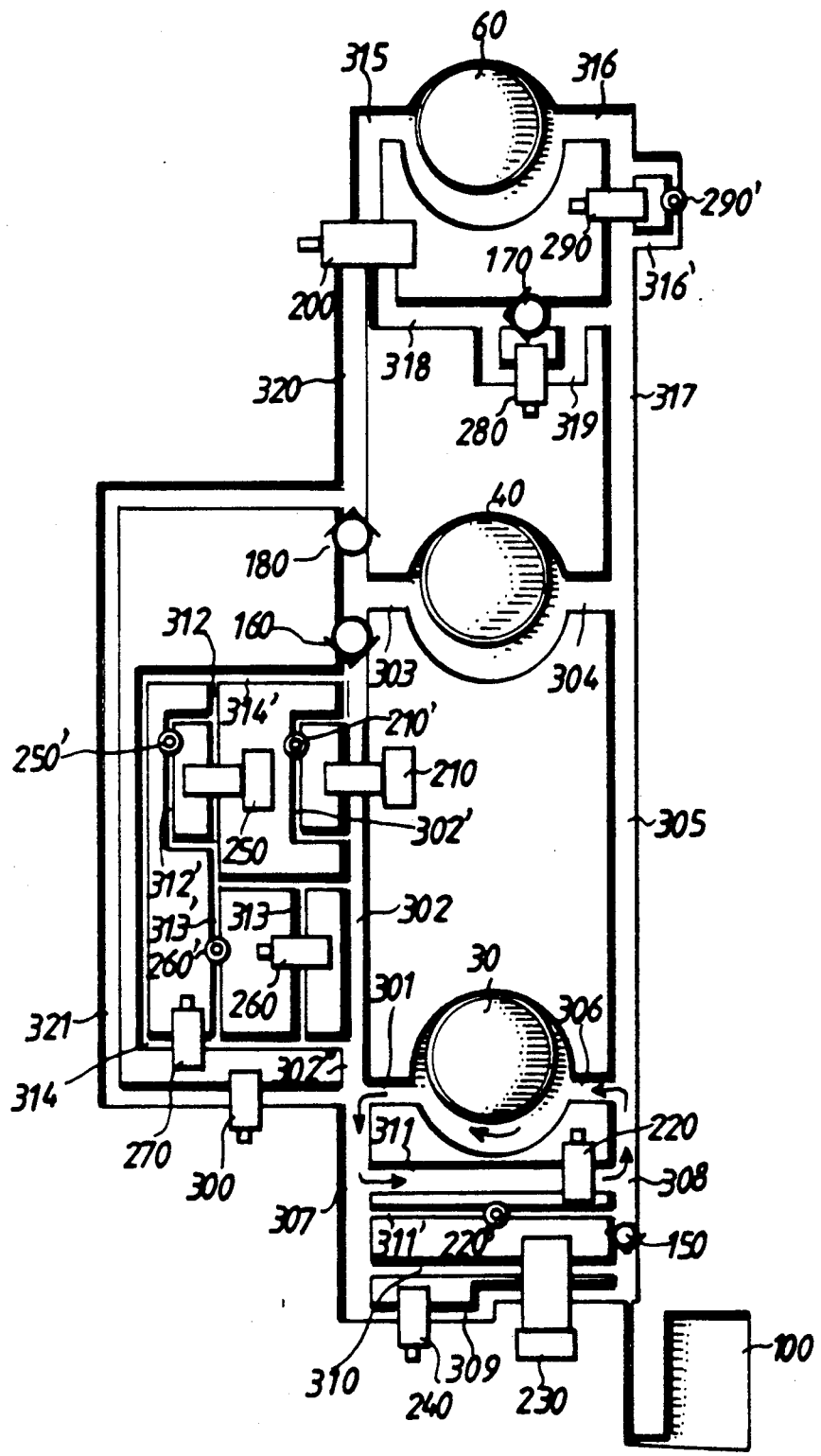
FIG. 4A is a schematic view of an oil system of the second embodiment according to the present invention in a standard type control system, wherein the arrows show the path of the working fluid when a shifting lever is at a neutral position.

Referring to FIG. 4A, when the shifting lever is at the neutral position, the oil from pump 30 flows through oil paths 301, 311, 308 and 306 and returns to pump 30 as indicated by the arrows shown in FIG. 4A.

Figure 4B:
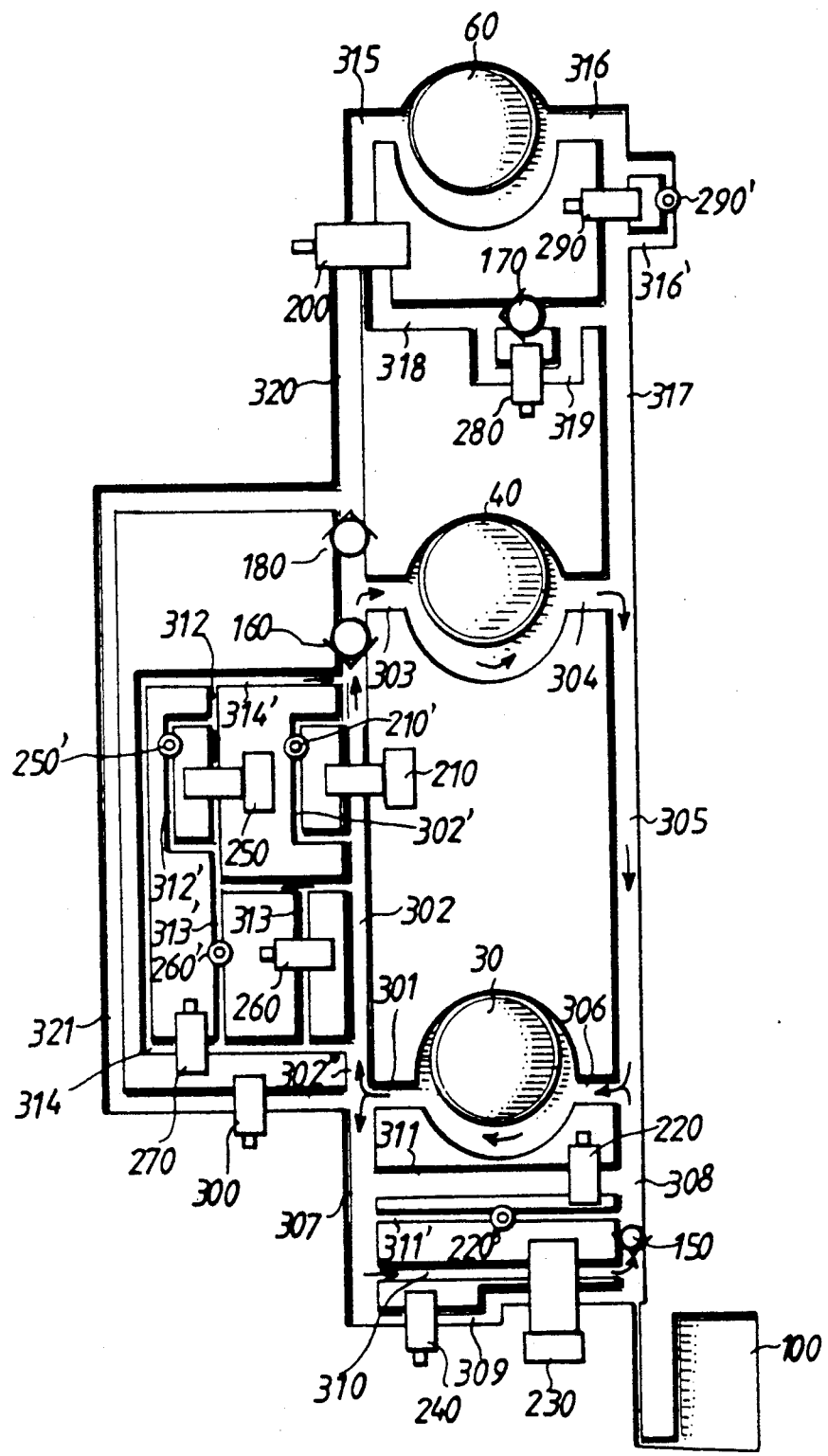
FIG. 4B is a schematic view of the oil system of FIG. 4A, wherein the arrows show the path of the working fluid when the shifting lever is at a forwarding position under an engine idling condition.
Figure 4C:
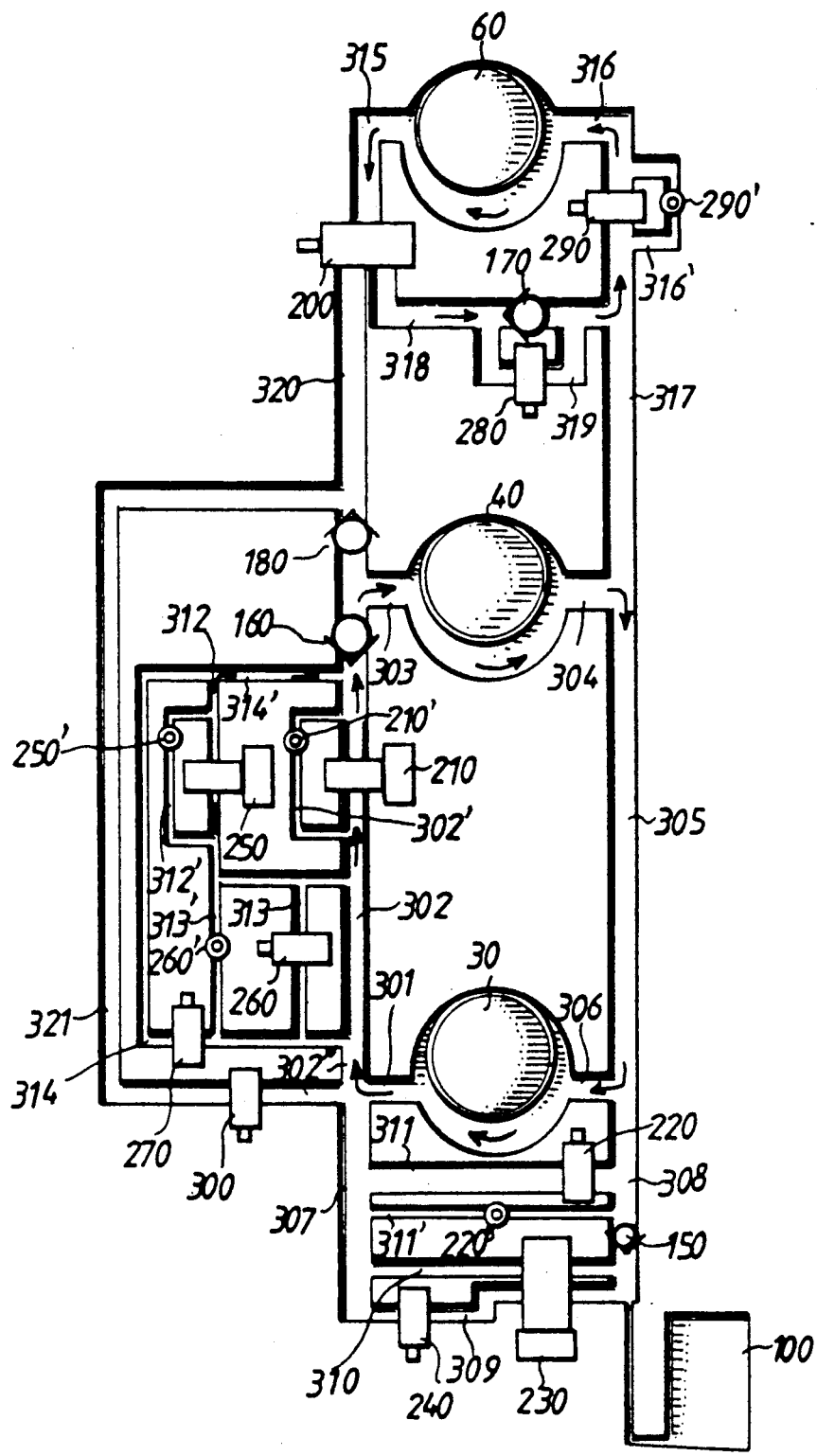
FIG. 4C, wherein the arrows show the path of the working fluid when the shifting lever is at a forwarding position and the accelerator is pressed.
Figure 40:
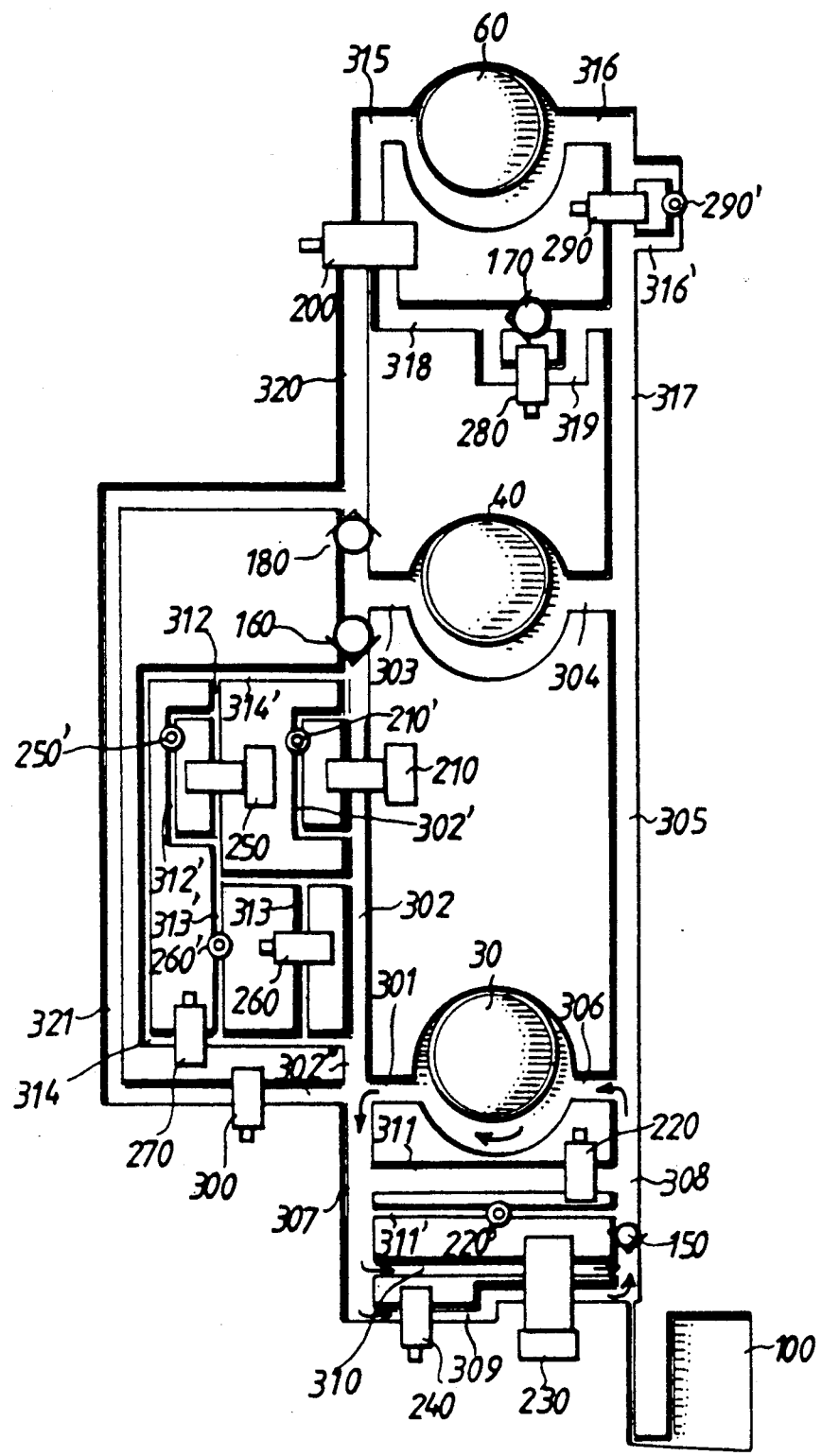
Figure 50:
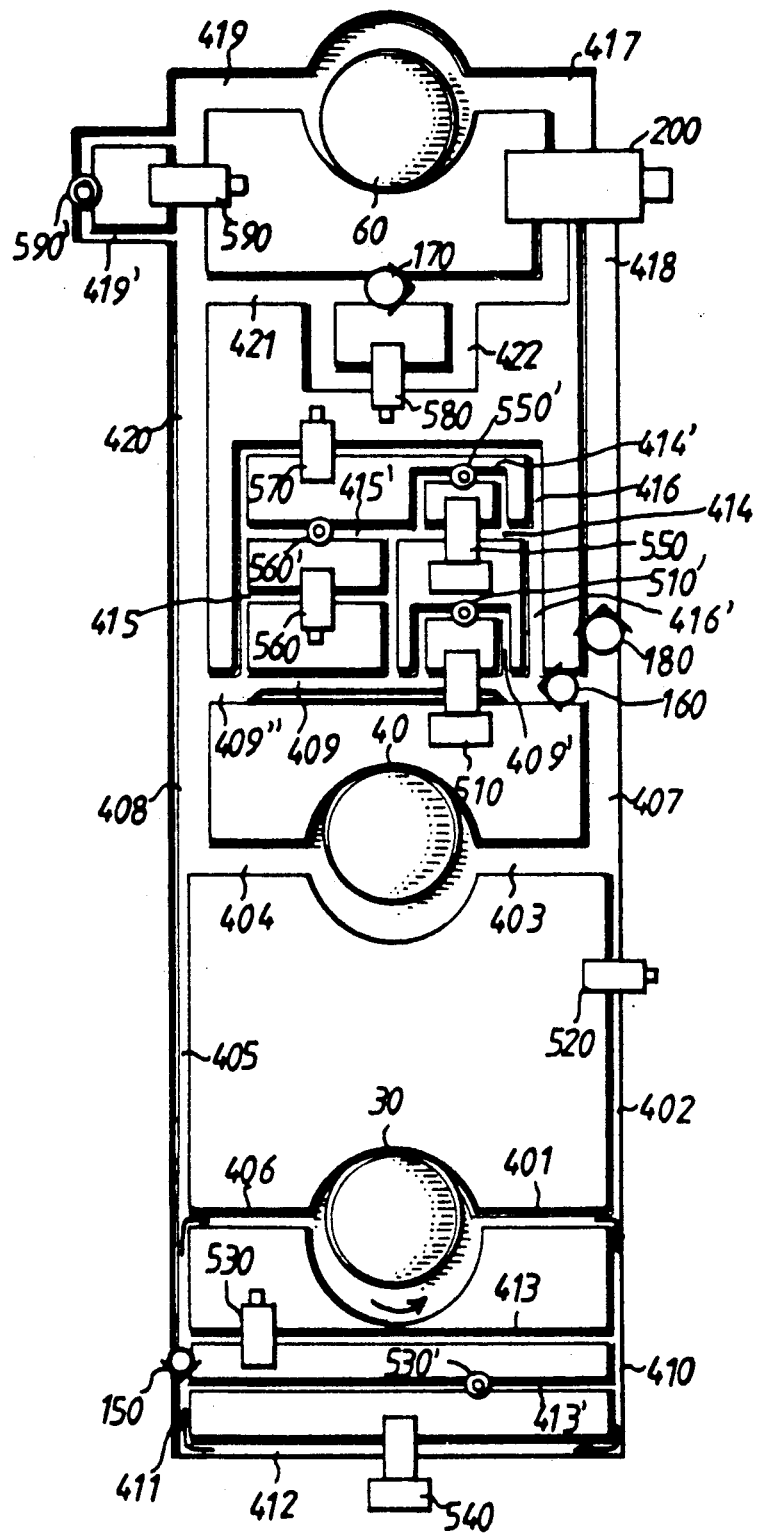

As shown in FIG. 4B, when the shifting lever is at a forwarding position under an engine idling condition, half of the flow from pump 30 flows back to pump 30 via oil path 311, the other half of the flow from pump 30 flows back to pump 30 via a first oil circuit consisting of oil paths 310, 302, 303, pump 40, oil paths 304, 305 and 306 as indicated by the arrows in FIG. 4B.

When the shifting lever is at the forwarding position and the accelerator is pressed and the critical point of free rotation is passed and effective driving begins. When the accelerator is pressed to a pre-determined extent, the control valve 230 is completely closed, the flow from pump 30 circles back to pump 30 via the first oil circuit mentioned above as shown in the arrows in FIG. 4C. When the accelerator is pressed to a pre-determined extent to completely close the control valve 210, there is no oil circling within the first oil circuit and ring gears 16 and 26 are completely braked.

As shown in FIG. 4D, when the shifting lever is at the reversing position and the accelerator is not pressed, the oil flows from the outlet of pump 30, passes through oil path 307, then half of the flow passes through oil path 309 and another half of the flow passes through oil path 310, then both flows circle back to pump 30 via oil paths 308 and 306 as clearly shown by the arrows in FIG. 4D.

As shown in FIG. 4E, when the accelerator is pressed to a pre-determined extent and valve 230 is completely closed, one-fourth of the flow from pump 30 flows through oil paths 302, 303 and pump 40 and returns to pump 30 via oil paths 304, 305 and 306; three-fourths of the flow from pump 30 flows to pump 60 via oil paths 304, 320 and 315 and returns to pump 30 via oil paths 316, 317, 305 and 306.

While in reverse, the power from the engine crankshaft 3 is transmitted to the rear propeller shaft 4 via sun gear 112, planet pinion 114, pump 30, pump 40, planet pinion 114 and sun gear 22 in sequence.

Figure 3F:
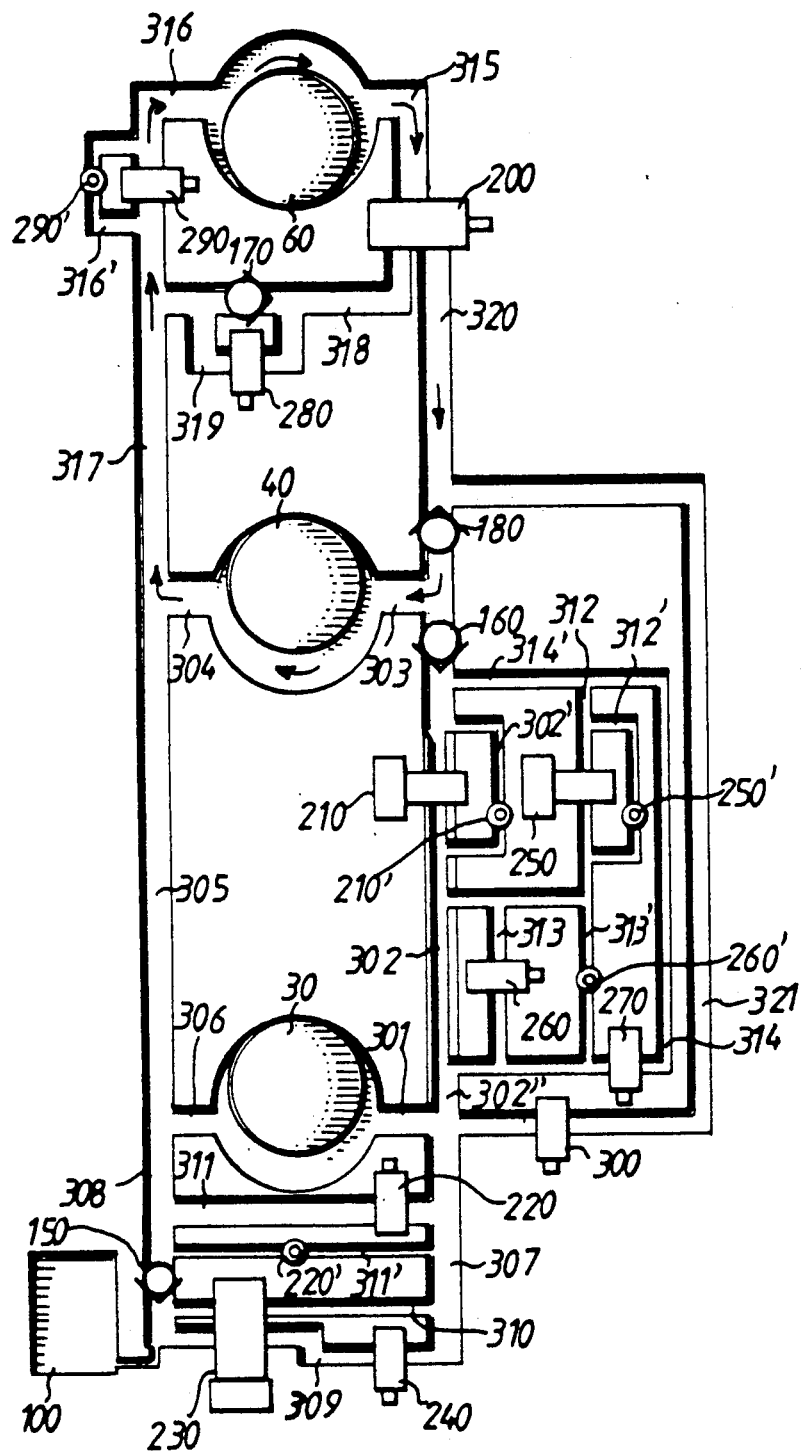
FIG. 3F is a schematic view of the oil system of FIG. 3A, wherein the arrows show the path of the working fluid during engine braking.

Please refer to FIG. 3F. When engine braking is needed, valve 200 closes oil path 318 and opens oil path 320. The oil flow from pump 60 flows through oil paths 315, 320, 303 and pump 40 and returns to pump 60 via oil paths 304, 317 and 316 as indicated by the arrows in FIG. 3F. Since the pump 40 is accelerated, the effect of engine braking is achieved.

4. First Embodiment In Economical Control Type

Please refer to FIG. 1 and especially to FIGS. 5A to 5F. The first embodiment 1 has been described above and the oil path system of the economical control type of the first embodiment is clearly shown in FIGS. 5A to 5F. Since the gear reduction ratio is primarily controlled by pump 40, furthermore, a smaller size of oil pump can be adopted to function as pump 30, therefore, this control system is titled "economical control system".

Please refer to FIGS. 5A to 5F. A first end of a first oil path 401 is communicated to an outlet of the first braking pump 30. A first end of a second oil path 402 is communicated to a second end of the first oil path 401. A first end of a third oil path 403 is communicated to a second end of the second oil path 402. A second end of the third oil path 403 is communicated to an inlet of the second braking pump 40.

A first end of a fourth oil path 404 is communicated to an outlet of the second braking pump 40. A first end of a fifth oil path 405 is communicated to a second end of the fourth oil path 404. A first end of a sixth oil path 406 is communicated to a second end of the fifth oil path 405. A second end of the sixth oil path 406 is communicated to an inlet of the first braking pump 30.

A first end of a seventh oil path 407 is communicated to the first end of the third oil path 403. A first end of an eighth oil path 408 is communicated to the second end of the fourth oil path 404. A ninth oil path 409 is communicated to a second end of the seventh oil path 407 and a second end of the eighth oil path 408 at two ends thereof.

Figure 12:
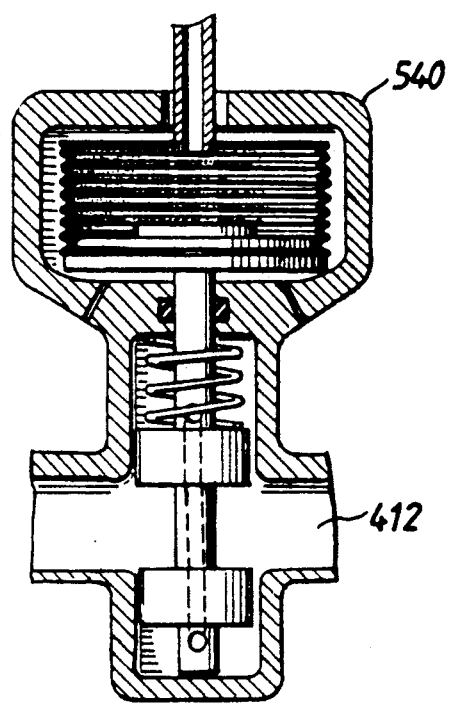
FIG. 12 is a cross-sectional view of a flow control valve provided for engine idling in economical control type.

Please refer to FIG. 12. A first flow control valve 510 is provided on the ninth oil path 409. The first flow control valve 510 is communicated to the centrifugal pump 50 at one end thereof. The first flow control valve 510 has the same construction and function as valve 210 (see FIG. 7).

A second flow control valve 520 (see FIG. 9) for reverse is provided on the second oil path 402. The second flow control valve 520 is opened when the shifting lever is at a reversing position. The second flow control valve is closed when the shifting lever is not at the reversing position. Valve 520 has the same structure as valve 220 as shown in FIG. 9.

A tenth oil path 410 is communicated to the second end of the first oil path 401 at a first end thereof. A first end of an eleventh oil path 411 is communicated to the first end of the sixth oil path 406. A first end and a second end of a twelfth oil path 412 are respectively communicated to a second end of the tenth oil path 410 and a second end of the eleventh oil path 411. A thirteenth oil path 413 is communicated to the tenth oil path 410 and the eleventh oil path 411 at two ends thereof.

A third flow control valve 530 for neutral is provided on the thirteenth oil path 413. The third flow control valve 530 is opened when the shifting lever is at a neutral position. The third flow control valve 530 (also see FIG. 9) is closed when the shifting lever is not at the neutral position.

Please refer to FIG. 12. A fourth control valve 540 is provided on the twelfth oil path 412. The fourth flow control valve 540 is closed if the accelerator is pressed to a pre-determined extent. Please notice that valve 540 has the same construction and function as valve 240 except that valve 240 has dual gates while valve 540 has only one gate as clearly shown in FIG. 12.

A fifth flow control valve 550 (also see FIG. 7) for overdrive is provided on a fourteenth oil path 414 which is communicated to the ninth oil path 409 at two ends thereof. The fifth flow control valve 550 is communicated to the centrifugal oil pump 50 at one end thereof and functions as the first flow control valve 510. The fifth flow control valve 550 starts to function after the car reaches a pre-set overdrive speed.

A sixth flow control valve 560 (also see FIG. 9) for economical starting is provided on a fifteenth oil path 415 which is communicated to the ninth oil path 409 at two ends thereof. When an economical starting is desired, valve 560 is closed.

A seventh flow control valve 570 (also see FIG. 9) for lowering the gear reduction ratio under urgent conditions is provided on a sixteenth oil path 416 which is communicated to the ninth oil path 409 at two ends thereof. The seventh flow control valve 570 is manually closed when a lowering of the gear reduction ratio is needed under urgent conditions.

A securing pump 60 for engine braking is mounted on the rear propeller shaft 4 with a rotor shaft 62 thereof. A first end of a seventeenth oil path 417 is communicated to a first end of the securing oil pump 60. A second end of the seventeenth oil path 417 is communicated to a first side of a split flow control valve 200. A first end of an eighteenth oil path 418 is communicated to a second side of the split-flow control valve 200. A second end of the eighteenth oil path 418 is communicated to a second end of the seventh oil path 407. A first end of a nineteenth oil path 419 is communicated to a second end of the securing oil pump 60. A second end of the nineteenth oil path 419 is communicated to a first end of a twentieth oil path 420. A second end of the twentieth oil path 420 is communicated to the second end of the eighth oil path 408.

A first end of a twenty-first oil path 421 is communicated to the second side of the split-flow control valve 200. A second end of the twenty-first oil path 421 is communicated to the second end of the nineteenth oil path 419. A twenty-second oil path 422 is communicated to the twenty-first oil path 421 at two ends thereof.

An eighth flow control valve 580 (also see FIG. 9) is provided on the twenty-second oil path 422. The eighth flow control valve 580 is opened when the shifting lever is at the neutral position or reversing position. The eighth flow control valve 580 is closed when the shifting lever is neither at the neutral position nor at the reversing position. A check is provided on the twenty-first oil path 421 between the two ends of the twenty-second oil path 422. The flow within the twenty-first oil path 421 is restrained so that the working fluid is only flowable from the first end of the twenty-first oil path 421 to the second end 25 of the twenty-first oil path 421.

A ninth flow control valve 590 (see FIG. 9) is provided on the nineteenth oil path 419 for braking when the braking system can not function properly. The ninth flow control valve 590 is closed when the braking system does not function properly and the braking pedal is pressed.

The split-flow control valve 200 (see FIG. 10) is arranged so that the total amount of flow of the eighteenth oil path 418 and the twenty-first oil path 421 is the same as the flow of the seventeenth oil path 417. The eighteenth oil path 418 is closed and the twenty-first oil path 421 is opened when the shifting lever is at the reversing position or forwarding position. The split-flow control valve 200 is manually operable to partially close both the eighteenth oil path 418 and the twenty-first oil path 421 for driving at a rated speed.

Referring to FIG. 5A, when the shifting lever is at the neutral position, the oil from pump 30 flows through oil paths 401, 413, 411 and 406 and returns to pump 30 as indicated by the arrows shown in FIG. 5A.

As shown in FIG. 5B, when the shifting lever is at a forwarding position under an engine idling condition, the flow from pump 30 flows back to pump 30 via oil paths 401, 410, 412, 411, and 406 as indicated by the arrows in FIG. 5B.

When the shifting lever is at the forwarding position and the accelerator is pressed and the critical point of free rotation is passed and effective driving begins. When the accelerator is pressed to a pre-determined extent, the control valve 540 is completely closed. Since flow control valve 520 is closed, there is no circling oil flow through pump 30 and pump 30 does not rotate. The gear reduction ratio is thus controlled by pump 40. The oil flow from pump 40 flows through oil paths 404, 408, 409, 407 and 403 and returns to pump 40. Furthermore, the oil flow from pump 60 flows through oil paths 417, 421 and 419 and returns to pump 60 as shown by the arrows in FIG. 5C.

As shown in FIG. 5D, when the shifting lever is at the reversing position and the accelerator is not pressed, the oil flows from the outlet of pump 30, passes through oil paths 401, 410, 412, 411 and 406 and returns to pump 30 as clearly shown by the arrows in FIG. 5D.

Figure 5E:
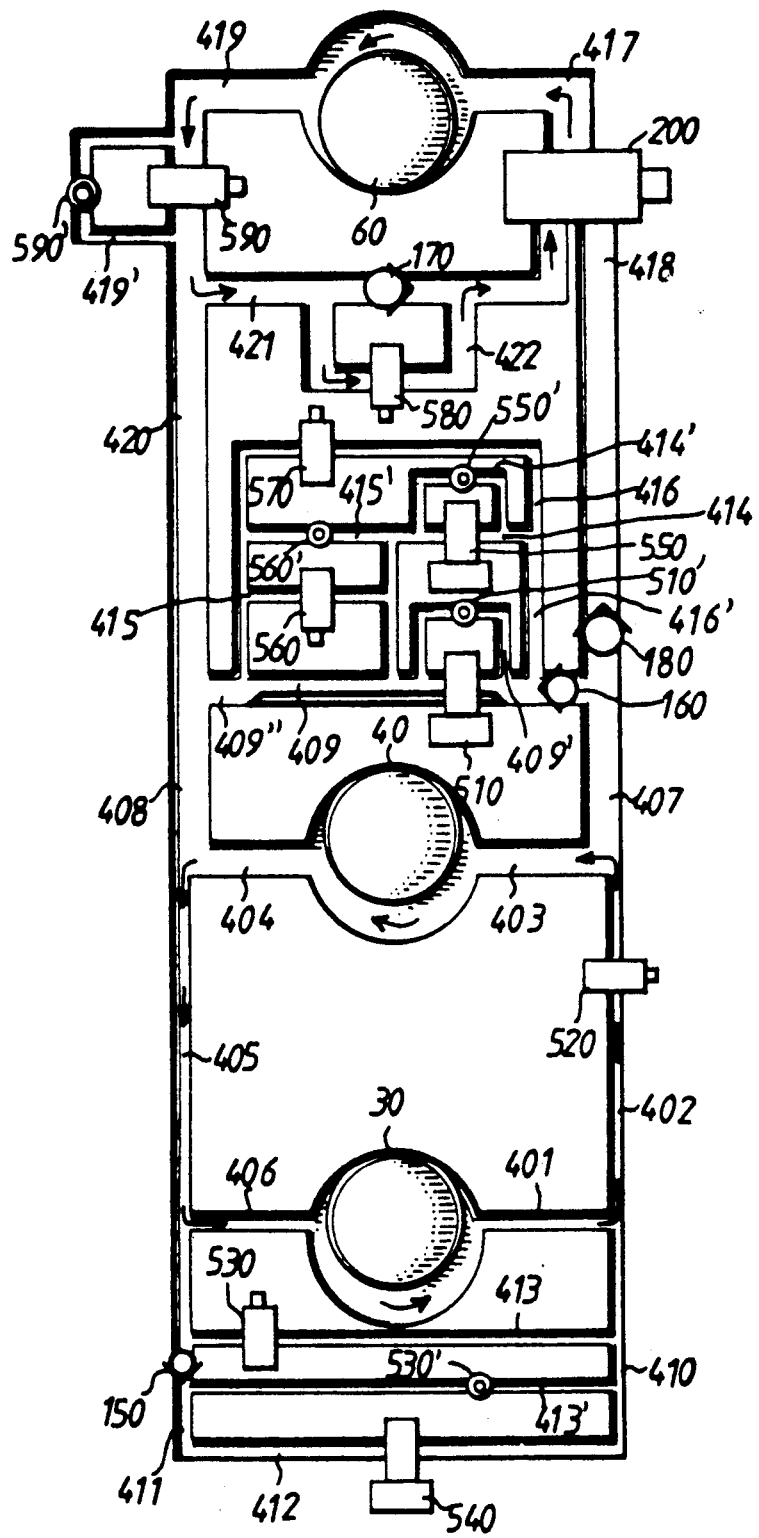
FIG. 5E is a schematic view of the oil system of FIG. 5A, wherein the arrows show the path of the working fluid when the shifting lever is at a reversing position and the accelerator is pressed.

As shown in FIG. 5E, when the accelerator is pressed to a pre-determined extent and valve 540 is completely closed. Since valve 520 is opened, the flow from pump 40 enters pump 30 via oil paths 404, 405 and 406 and circles back to pump 40 via oil paths 401 and 403. In addition, the oil flow from pump 60 circles via oil paths 419, 421, 422, 421 and 417 and returns to pump 60 as clearly shown in FIG. 5E.

As in the first embodiment in standard control type, a braking annular gear 48 is mounted on the planet pinion shaft 18. The braking annular gear 48 cooperates with a braking claw 46 mounted on an inner wall of the gear box to fix the planet pinion shaft 18 during reversing. The transmission of power between the first planetary gear 10 and the second planetary gear 20 is interrupted and it is completely reliant on the first and the second braking pump to transmit the power. While in reverse, the power from the engine crankshaft 3 is transmitted to the rear propeller shaft 4 via sun gear 12, planet pinion 14, ring gear 16, pump 30, pump 40, ring gear 26, planet pinion 14 and sun gear 22 in sequence.

Figure 5F:
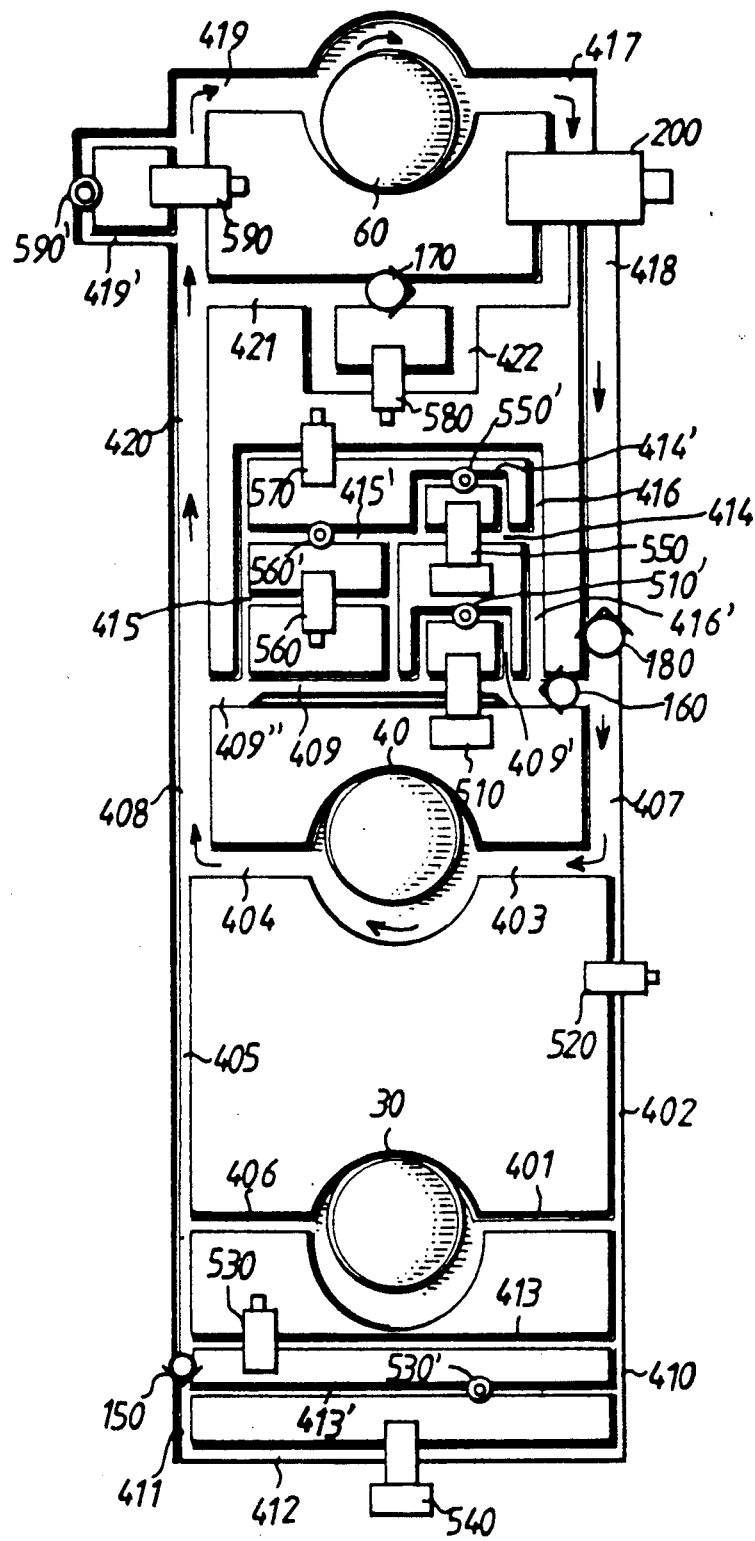
FIG. 5F is a schematic view of the oil system of FIG. 5A, wherein the arrows show the path of the working fluid during engine braking.

Please refer to FIG. 5F. When engine braking is needed, valve 200 closes oil path 421 and opens oil path 418. The oil that flows from pump 60 flows through oil paths 417, 418, 407 and 403, and then pump 40 and returns to pump 60 via oil paths 404, 408, 420, and 419 as clearly shown in FIG. 5F. Since the pump 40 is accelerated, the effect of engine braking is achieved.

The check valves 150, 160, 170 and 180 and the corresponding relief valves 510', 530', 550', and 560' have the same function as they act in standard control type which is obvious to those skilled in the art and needs no further explanation.

Figure 11:
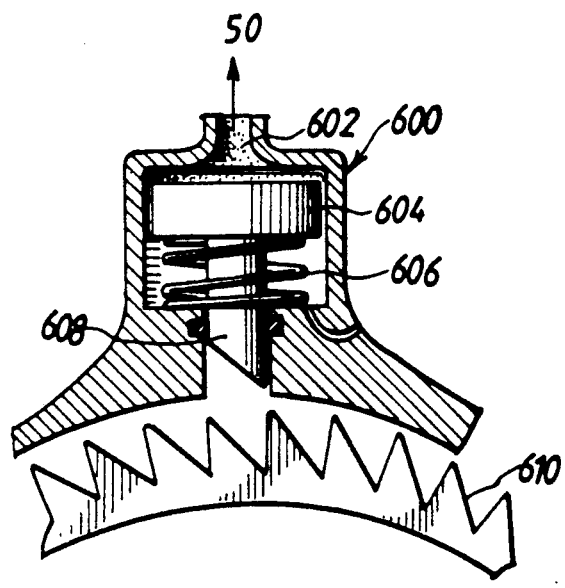
FIG. 11 is a cross-sectional view of a braking valve and an annular ratchet according to the present invention.

Please refer to FIG. 11. A braking valve 600 is mounted on said inner wall of the gear box. The braking valve 600 is communicated to the centrifugal pump 50 at one end thereof. The braking valve 600 engages with an annular ratchet 610 provided on an outer periphery of the ring gear 16 of the first planetary gear 10 when the centrifugal pump 50 outputs working fluid in response to the rotation speed of the rear propeller shaft 4. As seen from FIG. 11, when the car reaches a certain speed, the force acts on a piston head 604 due to the working fluid 602 overcoming the spring 606 and forcing the engaging member 608 to mesh with the annular ratchet 610. Accordingly, pump 30 is rapidly braked due to the provision of the braking valve 600 and the annular ratchet 610.

5. Second Embodiment In Economical Control Type

Please refer to FIG. 2 and FIGS. 6A to 6F. The second embodiment 2 is described above and the oil path system of the second embodiment in economical control type is the same as the oil path system of the economical control type in the first embodiment. Furthermore, the function and position of each control valve in this economical type of the second embodiment are the same as the controls valves in the economical control type of the first embodiment and need no further description.

Figure 6A:
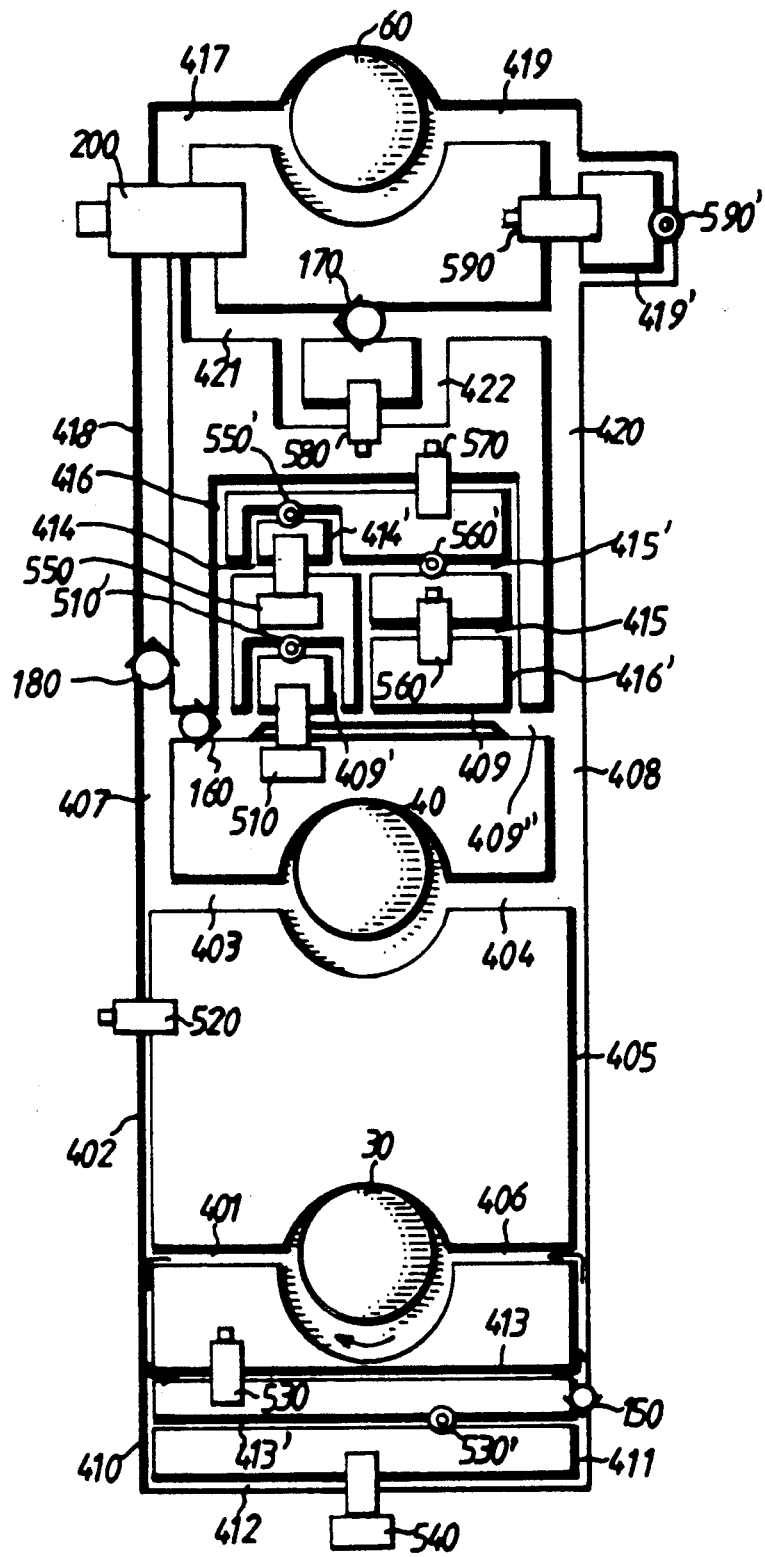
FIG. 6A is a schematic view of an oil system of the second embodiment according to the present invention in an economical type control system, wherein the arrows show the path of the working fluid when a shifting lever is at a neutral position.

Referring to FIG. 6A, when the shifting lever is at the neutral position, the oil from pump 30 flows through oil paths 401, 413, 411 and 406 and returns to pump 30 as indicated by the arrows shown in FIG. 6A.

Figure 6B:
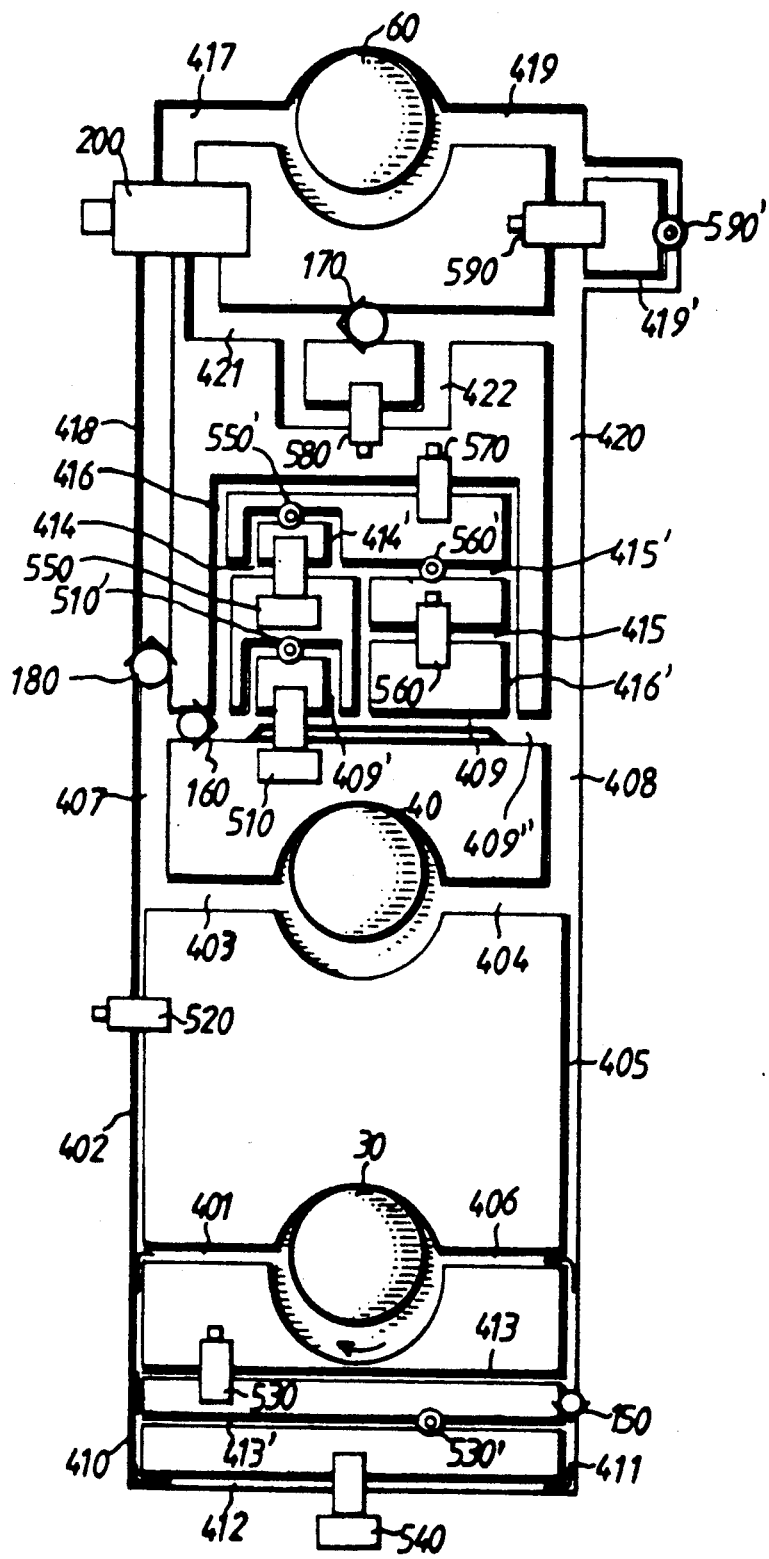
FIG. 6B is a schematic view of the oil system of FIG. 6A, wherein the arrows show the path of the working fluid when the shifting lever is at a forwarding position under an engine idling condition.
Figure 6C:
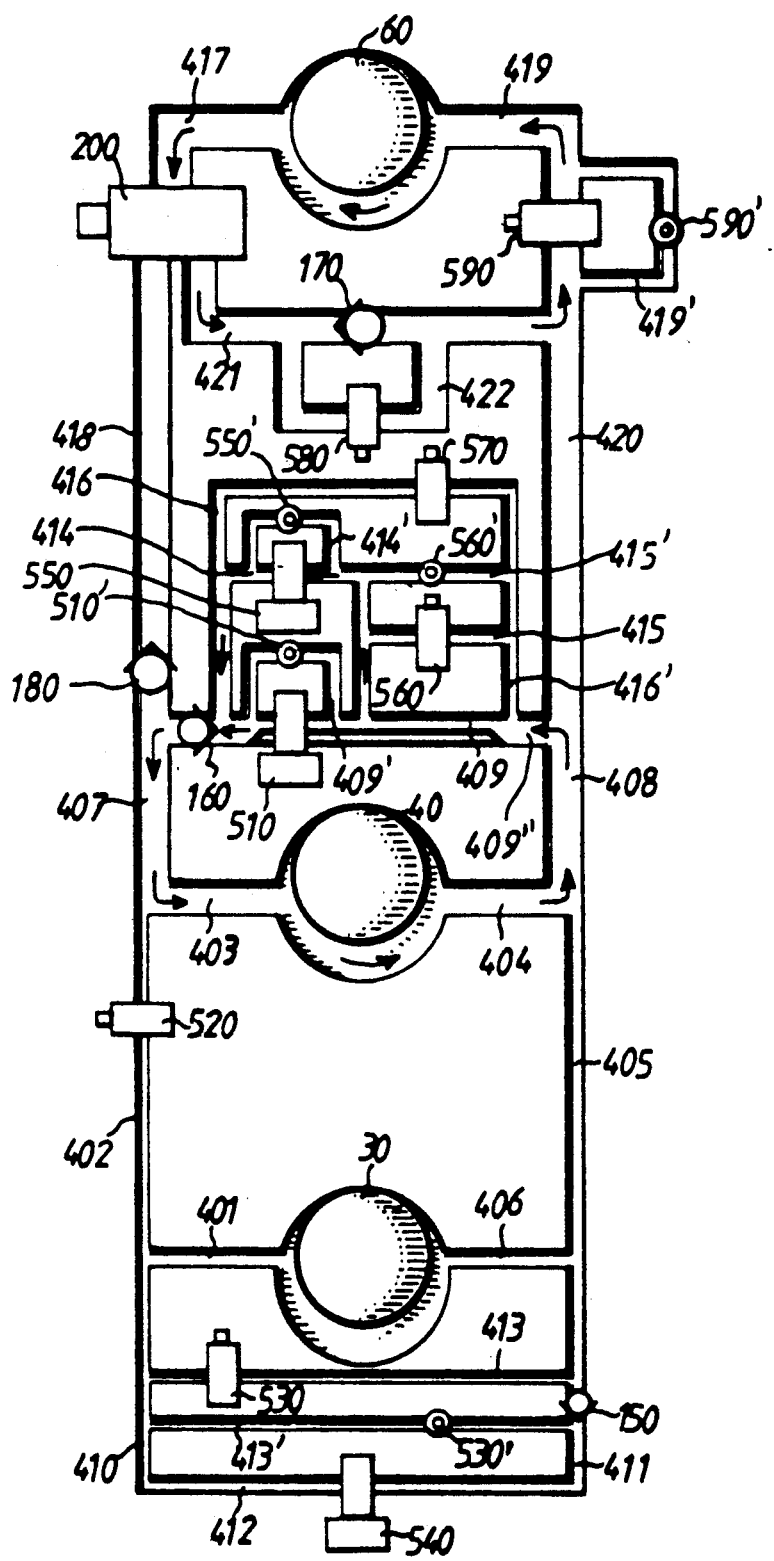
FIG. 6C is a view of the oil system of FIG. 6A, wherein the arrows show the path of the working fluid when the shifting lever is at a forwarding position and the accelerator is pressed.
Figure 60:
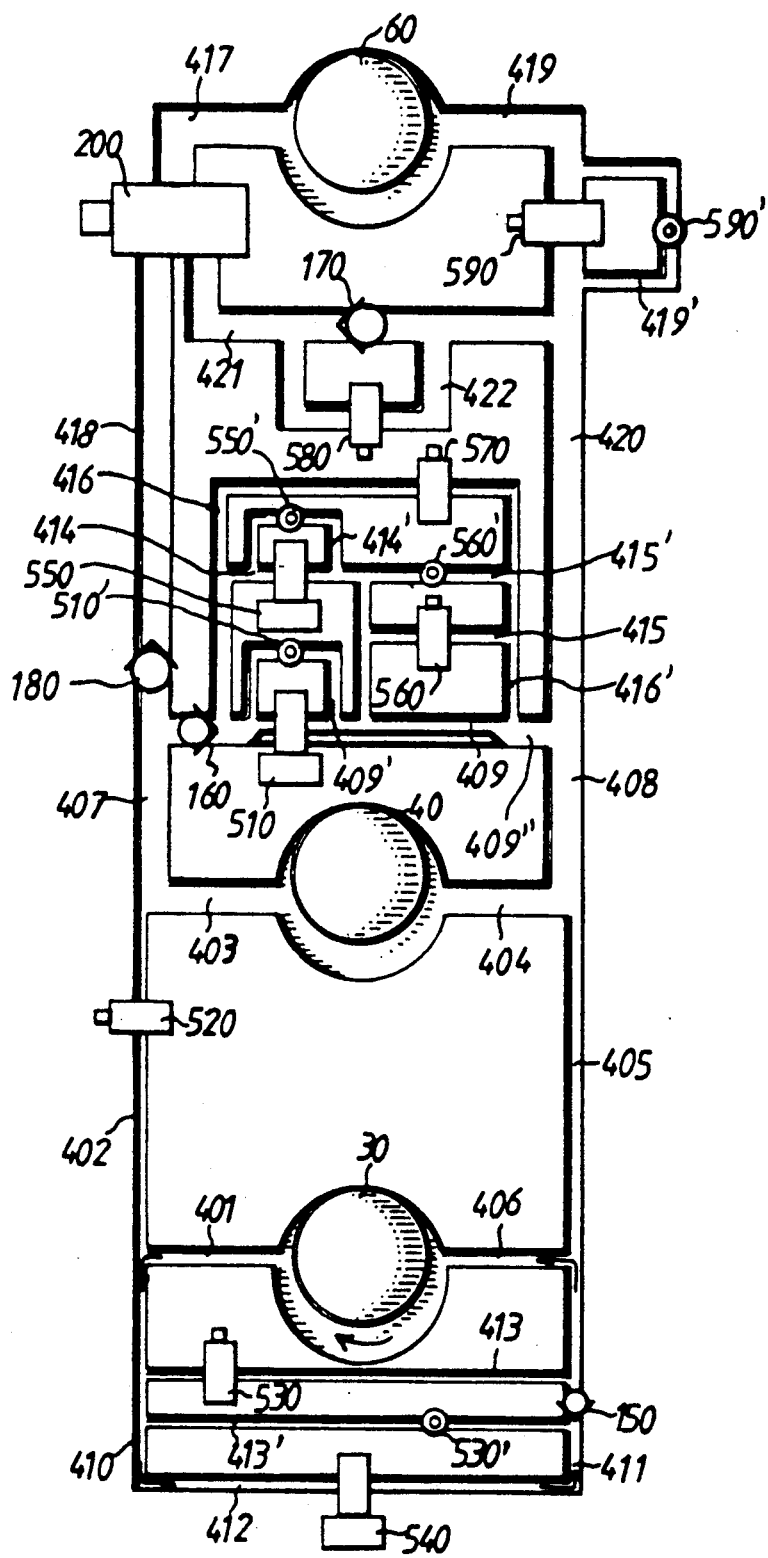

As shown in FIG. 6B, when the shifting lever is at a forwarding position under an engine idling condition, the flow from pump 30 flows back to pump 30 via oil paths 401, 410, 412, 411, and 406 as indicated by the arrows in FIG. 6B.

When the shifting lever is at the forwarding position and the accelerator is pressed and the critical point of free rotation is passed and effective driving begins. When the accelerator is pressed to a pre-determined extent, the control valve 540 is completely closed. Since flow control valve 520 is closed, there is no circling oil flow through pump 30 and pump 30 does not rotate.

The gear reduction ratio is thus controlled by pump 40. The oil flow from pump 40 flows through oil paths 404, 408, 409, 407 and 403 and returns to pump 40. Furthermore, the oil flow from pump 60 flows through oil paths 417, 421 and 419 and returns to pump 60 as shown by the arrows in FIG. 6C.

As shown in FIG. 6D, when the shifting lever is at the reversing position and the accelerator is not pressed, the oil flows from the outlet of pump 30, passes through oil path 401, 410, 412, 411 and 416 and returns to pump 30 as clearly shown by the arrows in FIG. 6D.

Figure 6E:
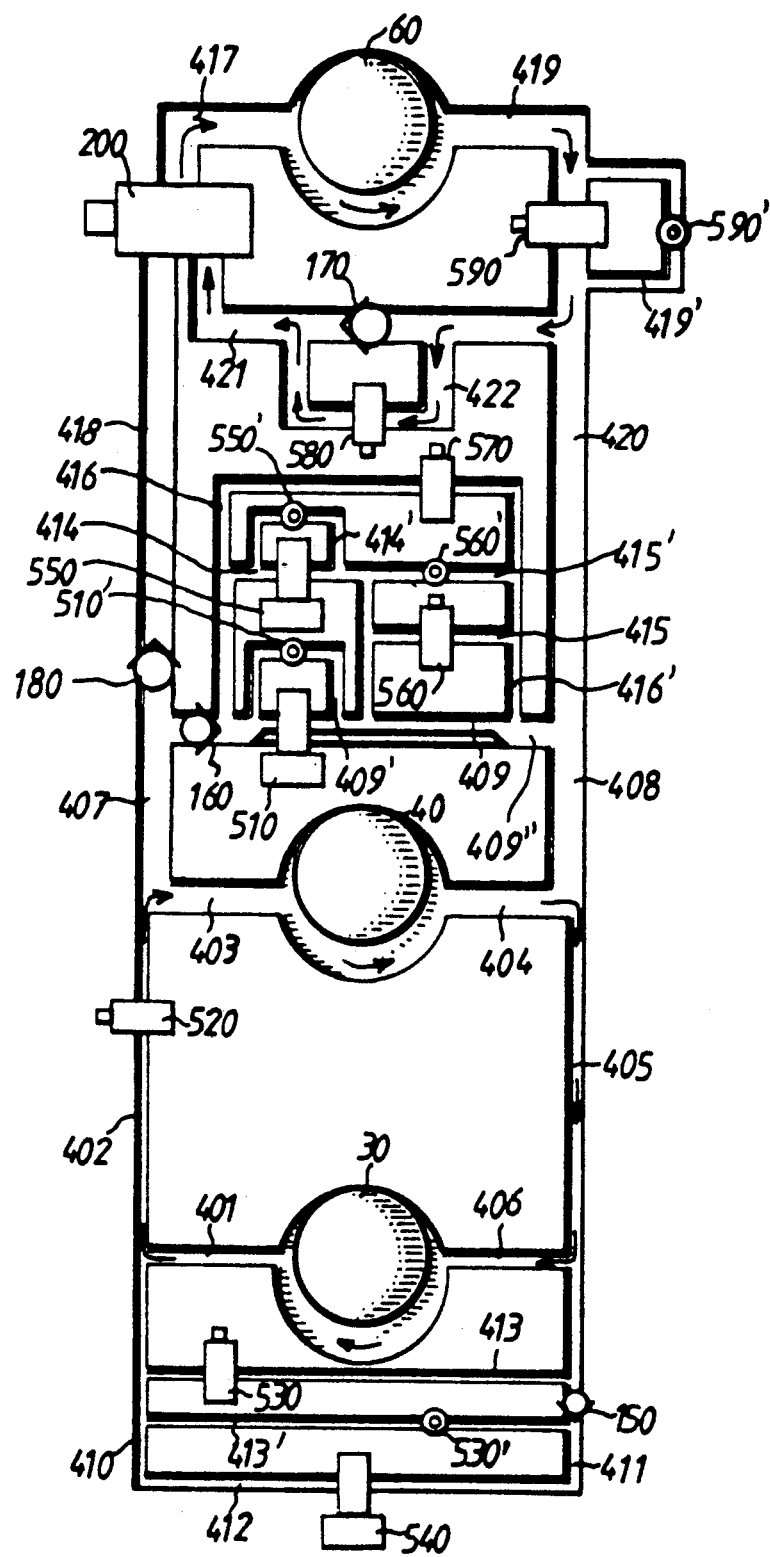
FIG. 6E is a schematic view of the oil system of FIG. 6A, wherein the arrows show the path of the working fluid when the shifting lever is at a reversing position and the accelerator is pressed.

As shown in FIG. 6E, when the accelerator is pressed to a pre-determined extent and valve 540 is completely closed. Since valve 520 is opened, the flow from pump 40 enters pump 30 via oil paths 404, 405 and 406 and circles back to pump 40 via oil paths 401 and 403. In addition, the oil flow from pump 60 circles via oil paths 419, 421, 422, 421 and 417 and returns to pump 60 as clearly shown in FIG. 6E.

As in the second embodiment in standard control type, a braking annular gear 48 is mounted on an outer periphery of the ring gear 116. The braking annular gear 48 cooperates with a braking claw 46 mounted on an inner wall of the gear box to fix the ring gear 116 during the reversing condition.

While in reverse, the power from the engine crankshaft 3 is transmitted to the rear propeller shaft 4 via sun gear 112, planet pinion 114, pump 30, pump 40, planet pinion 114 and sun gear 22 in sequence.

Figure 6F:
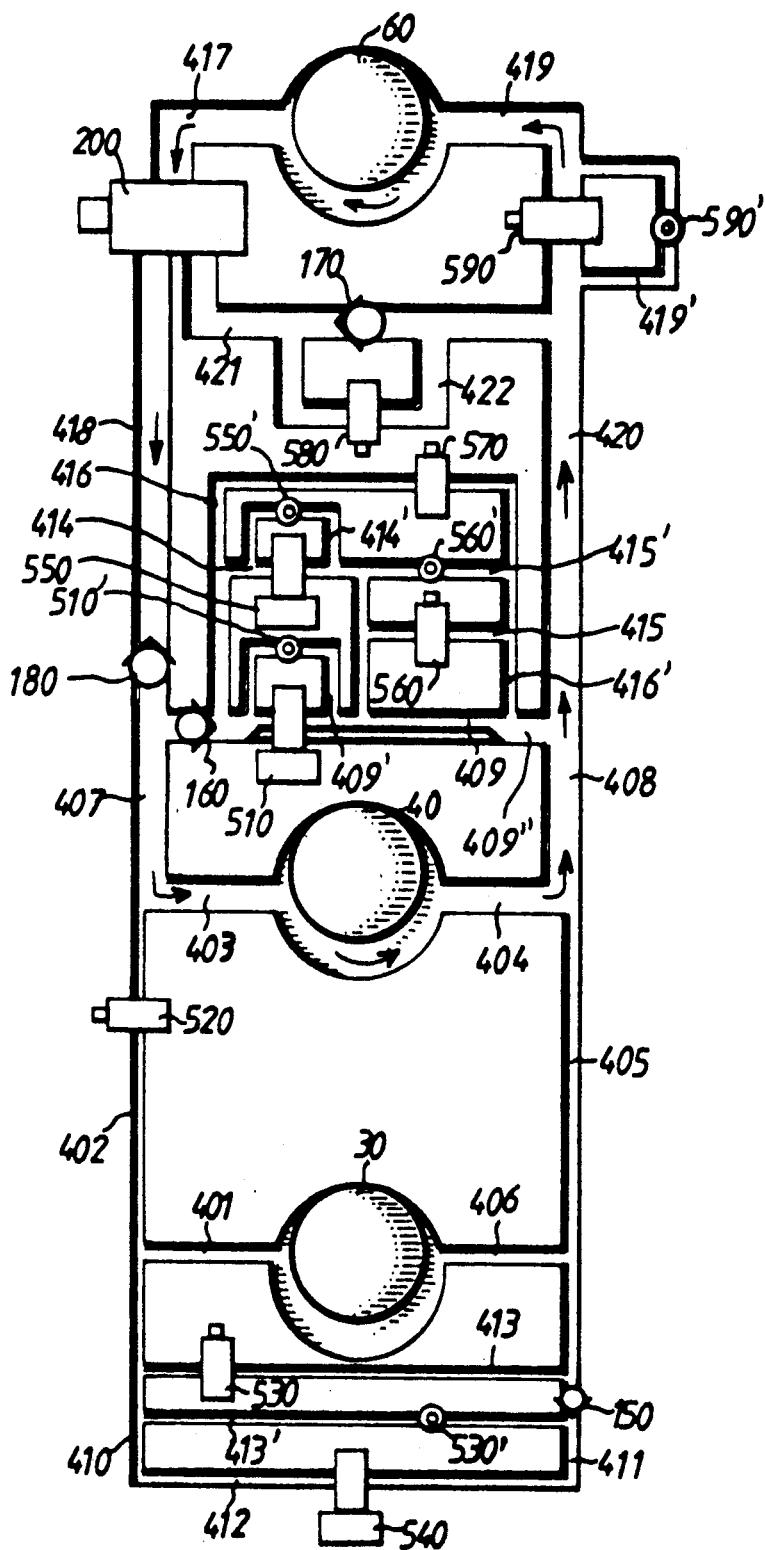
FIG. 6F is a schematic view of the oil system of FIG. 6A, wherein the arrows show the path of the working fluid during engine braking.

Please refer to FIG. 6F. When engine braking is needed, valve 200 closes oil path 421 and opens oil path 418. The oil flow from pump 60 flows through oil paths 417, 418, 407 and 403, and then pump 40 and returns to pump 60 via oil paths 404, 408, 420, and 419 as clearly shown in FIG. 6F. Since pump 40 is accelerated, the effect of engine braking is achieved.

Please refer to FIG. 11. A braking valve 600 is mounted on said inner wall of the gear box. The braking valve 600 is communicated to the centrifugal pump 50 at one end thereof. The braking valve 600 engages with an annular ratchet 610 provided on an outer periphery of an extension of the planet carrier 119 of the first planetary gear 110 when the centrifugal pump 50 outputs working fluid in response to a rotating speed of the rear propeller shaft 4. As seen from FIG. 11, when the car reaches a certain speed, a force acts on a piston head 604 due to the working fluid 602 overcoming the spring 606 and forcing the engaging member 608 to mesh with the annular ratchet 610. Accordingly, pump 30 is rapidly braked due to the provision of the braking valve 600 and the annular ratchet 610.

6. Overdrive

In standard control type (see FIGS. 3A to 3F and 4A to 4F), if an overdrive transmission is needed, a third planetary gear (not shown) is provided on the rear propeller shaft 4 behind pump 60. In the third planetary gear, the sun gear is fixed and functions as a braking member, the planetary carrier functions as a driving member and the ring gear functions as a driven member. For example, if the gear number of the sun gear and the ring gear and the effective gear number of the planetary gear are respectively 22, 66 and 88, the gear reduction ratio of the third planetary gear is 0.75:1.

In economical control type (see FIGS. 5A to 5F and 6A to 6F), an overdrive transmission is achieved by changing the gear number of the first planetary gear 110. For example, if the original gear numbers of both the first and the second planetary gears are 22, 66 and 88 (for the sun gear, the ring gear and the planetary carrier, respectively) and it is wished to obtain the gear reduction ratio of overdrive, then the original gear numbers are changed to 33, 66 and 99, respectively, noting that the gear number of the second planetary gear remains unchanged.

OPERATION

It is appreciated that the description of the operation of the present invention herein is for the purpose of explanation only, not for limiting the present invention. The gear numbers of the sun gear and the ring gear and the effective gear number of the first planetary gear for both the first and the second planetary gears are 22, 66 and 88, respectively. The gear reduction ratio of the present invention is given for certain conditions, for example, when the flows of pumps 30 and 40 are one-fourth, two-fourths or three-fourths of their full flows.

Please refer to Tables 1 to 4. Table 1 shows the dimensions of each oil flow path and each oil pump of the first embodiment in standard control type. Table 2 shows the dimensions of each oil flow path and each oil pump of the second embodiment in standard control type. Table 3 shows the dimensions of each oil flow path and each oil pump of the first embodiment in economical control type. Table 4 shows the dimensions of each oil flow path and each oil pump of the second embodiment in economical control type. Please notice that the oil paths and pumps are represented by corresponding numerals. The full flow is represented by 4/4.

TABLE 1

| oil path or pump | dimension |
| --- | --- |
| 30 | 4/4 |
| 40 | 4/4 |
| 60 | 4/4 |
| 301 | 4/4 |
| 302 | 2/4 |
| 302' | ¼ |
| 302" | ¾ |
| 303 | 4/4 |
| 304 | 4/4 |
| 305 | 4/4 |
| 306 | 4/4 |
| 307 | 4/4 |
| 308 | 4/4 |
| 309 | 2/4 |
| 310 | 2/4 |
| 311 | 4/4 |
| 311' | ¼ |
| 312 | ¼ |
| 312' | ¼ |
| 313 | ¼ |
| 313' | ¼ |
| 314 | ¼ |
| 314' | 2/4 |
| 315 | 4/4 |
| 316 | 4/4 |
| 316' | 4/4 |
| 317 | 4/4 |
| 318 | 4/4 |
| 319 | 4/4 |
| 320 | 4/4 |
| 321 | 4/4 |

TABLE 2

| oil path or pump | dimension |
| --- | --- |
| 30 | 4/4 |
| 40 | 4/4 |
| 60 | ¾ |
| 301 | 4/4 |

TABLE 2-continued

| oil path or pump | dimension |
|---|---|
| 302 | 2/4 |
| 302' | 1/4 |
| 302" | 3/4 |
| 303 | 3/4 |
| 304 | 3/4 |
| 305 | 3/4 |
| 306 | 4/4 |
| 307 | 4/4 |
| 308 | 4/4 |
| 309 | 2/4 |
| 310 | 2/4 |
| 311 | 4/4 |
| 311' | 1/4 |
| 312 | 1/4 |
| 312' | 1/4 |
| 313 | 1/4 |
| 313' | 1/4 |
| 314 | 1/4 |
| 314' | 2/4 |
| 315 | 3/4 |
| 316 | 3/4 |
| 316' | 3/4 |
| 317 | 3/4 |
| 318 | 3/4 |
| 319 | 3/4 |
| 320 | 3/4 |
| 321 | 3/4 |

TABLE 3

| oil path or pump | dimension |
|---|---|
| 30 | 1/4 |
| 40 | 4/4 |
| 60 | 4/4 |
| 401 | 1/4 |
| 402 | 1/4 |
| 403 | 4/4 |
| 404 | 4/4 |
| 405 | 1/4 |
| 406 | 1/4 |
| 407 | 4/4 |
| 408 | 4/4 |
| 409 | 2/4 |
| 409' | 1/4 |
| 409" | 3/4 |
| 410 | 1/4 |
| 411 | 1/4 |
| 412 | 1/4 |
| 413 | 1/4 |
| 413' | 1/4 |
| 414 | 1/4 |
| 414' | 1/4 |
| 415 | 1/4 |
| 416 | 1/4 |
| 416' | 2/4 |
| 417 | 4/4 |
| 418 | 4/4 |
| 419 | 4/4 |
| 420 | 4/4 |
| 421 | 4/4 |
| 422 | 4/4 |

TABLE 4

| oil path or pump | dimension |
|---|---|
| 30 | 1/4 |
| 40 | 4/4 |
| 60 | 3/4 |
| 401 | 1/4 |
| 402 | 1/4 |
| 403 | 3/4 |
| 404 | 3/4 |
| 405 | 1/4 |
| 406 | 1/4 |
| 407 | 3/4 |
| 408 | 3/4 |
| 409 | 2/4 |
| 409' | 1/4 |
| 409" | 3/4 |
| 410 | 1/4 |
| 411 | 1/4 |
| 412 | 1/4 |
| 413 | 1/4 |
| 413' | 1/4 |
| 414 | 1/4 |
| 414' | 1/4 |
| 415 | 1/4 |
| 416 | 1/4 |
| 416' | 2/4 |
| 417 | 3/4 |
| 418 | 3/4 |
| 419 | 3/4 |
| 420 | 3/4 |
| 421 | 3/4 |
| 422 | 3/4 |

The operations under both the forwarding condition and the reversing condition are illustrated hereinbelow since the operations under neutral condition and idling condition have been detailed hereinbefore.

Furthermore, a dimension of a last portion 314' of the fourteenth oil path 314 (in standard control type) is 2/4 (see Tables 1 and 2) since 314' accepts the flow from the fourteenth oil path 314 and the twelfth oil path 312 (see FIGS. 3A to 3F and 4A to 4F). Also a dimension of a last portion 416' of the sixteenth oil path 416 (in economical control type) is 2/4 (see Tables 3 and 4) since 416' accepts the flows from oil paths 416 and 414. If 314' and 416' are respectively communicated to the second oil path 302 and the ninth oil path 409, the flows of 314' and 416' are 1/4.

Additionally, in order to obtain the effect of economical starting in standard control type, the dimension of an oil path 302" between an intersection of oil paths 302 and 301 and an intersection of oil paths 302 and 313 is 3/4 (see Tables 1 and 2 and FIGS. 3A to 3F and 4A to 4F). The dimension of oil path 302 is 2/4 (see Tables 1 and 2). When valve 260 is closed, the flow which enters pump 40 is reduced from 3/4 to 2/4 and obtains the effect of economical starting. Also, in order to obtain the effect of economical starting in economical control type, the dimension of an oil path 409" between an intersection of oil paths 409 and 415 and an intersection of oil paths 409 and 408 is 3/4 (see Tables 3 and 4 and FIGS. 5A to 5F and 6A to 6F). The dimension of oil path 409 is 2/4 (see Tables 3 and 4.

a. The First Embodiment 1 In Standard Control Type (i) Forwarding:

Please refer to Table 5. The gear reduction ratio of the automatic transmission and the flows within oil paths and pumps are listed below in Table 5, wherein the overdrive is not discussed.

TABLE 5

| control system (flow) | | first planetary gear (relative rotating speed) | | | second planetary gear (relative rotating speed) | | | gear reduction ratio |
|---|---|---|---|---|---|---|---|---|
| **230 | 210 | 12 | 16 & 30 | 28 | 28 | 26 & 40 | 22 | |
| 2/4 | ¾ | 6 | 3/2 | ¾ | ¾ | ¼ | 0 | 6:0 |
| ¼ | ¾ | 6 | 1 | 9/16 | 9/16 | ¾ | 0 | 6:0 |
| 0/4 | ¾ | 6 | ¾ | 15/16 | 15/16 | ¾ | 3/2 | 4:1 |
| 0/4 | 2/4 | 6 | ½ | 9/8 | 9/8 | ½ | 3 | 2:1 |
| 0/4 | ¼ | 6 | ¼ | 13/16 | 13/16 | ¼ | 9/2 | 4:3 |
| 0/4 | 0/4 | 6 | 0 | 3/2 | 3/2 | 0 | 6 | 1:1 |

The above gear reduction ratios are for a standard control type provided without economical starting.
The gear reduction ratios listed below are for a standard control type provided with economical starting.

| 2/4 | 2/4 | 6 | 3/2 | ¾ | ¾ | ½ | 0 | 6:0 |
|---|---|---|---|---|---|---|---|---|
| ¼ | 2/4 | 6 | 1 | ¾ | ¾ | ½ | 3/2 | 4:1 |
| 0/4 | 2/4 | 6 | ½ | 9/8 | 9/8 | ½ | 3 | 2:1 |
| 0/4 | ¼ | 6 | ¼ | 13/16 | 13/16 | ¼ | 9/2 | 4:3 |
| 0/4 | 0/4 | 6 | 0 | 3/2 | 3/2 | 0 | 6 | 1:1 |

*rotates in a converse direction
**corresponding numerals according to the present invention (ii) Reversing:
Please refer to FIG. 3E and Table 1. After the accelerator is pressed to the pre-determined extent and valve 230 is closed, one-fourth of the flow from pump 30 passes through pump 40, three-fourths of the flow from pump 30 enters pump 60 via oil paths 321, 320 and 315 to rotate pump 60 conversely. While in reverse, the engine crankshaft 3 meshes with the sun gear 12 of the first planetary gear 10 to rotate, for example, 4 cycles, while the ring gear 16 of the first planetary gear 10 connects with pump 30 to rotate 1.33 cycles conversely. The amount of flow of pump 30 is 1.33 cycles * 4/4 per cycle = 5.33/4, wherein 4/4 of the 5.33/4 flows to pump 60 to rotate pump 60 conversely and the remainder, 1.33/4, flows to pump 40 to rotate pump 40 0.33 cycles in the same direction as the crankshaft 3. Pump 40 connects with the ring gear 26 of the second planetary gear 20 to drive the sun gear 22 of the second planetary gear 20 to rotate 1 cycle conversely (which matches the converse rotating of 1 cycle of pump 60). Therefore, a reversing gear reduction ratio of 4:1 is obtained. If an overdrive with a gear reduction ratio of 0.75:1 is provided, the final gear reduction ratio is 3:1.

b. The Second Embodiment 2 In Standard Control Type (i) Forwarding:
Please refer to Table 6. The gear reduction ratio of the automatic transmission and the flows within oil paths and pumps is listed below in Table 6, wherein the overdrive is not discussed.

TABLE 6

| control system (flow) | | first planetary gear (relative rotating speed) | | | second planetary gear (relative rotating speed) | | | gear reduction ratio |
|---|---|---|---|---|---|---|---|---|
| **230 | 210 | 112 | 119 & 30 | 116 | 116 | 129 & 40 | 122 | |
| 2/4 | ¾ | 6 | 9/8 | ½ | ½ | 3/8 | 0 | 6:0 |
| ¼ | ¾ | 6 | ¾ | ¾ | ¾ | 9/16 | 0 | 6:0 |
| 0/4 | ¾ | 6 | 9/16 | 5/4 | 5/4 | 9/16 | 3/2 | 4:1 |
| 0/4 | 2/4 | 6 | 3/8 | 3/2 | 3/2 | 3/8 | 3 | 2:1 |
| 0/4 | ¼ | 6 | 3/16 | 7/4 | 7/4 | 3/16 | 9/2 | 4:3 |
| 0/4 | 0/4 | 6 | 0 | 2 | 2 | 0 | 6 | 1:1 |

The above gear reduction ratios are for a standard control provided without economical starting.
The gear reduction ratios listed below are for a standard control type provided with economical starting.

| 2/4 | 2/4 | 6 | 9/8 | ½ | ½ | 3/8 | 0 | 6:0 |
|---|---|---|---|---|---|---|---|---|
| ¼ | 2/4 | 6 | ¾ | 1 | 1 | 3/8 | 3/2 | 4:1 |
| 0/4 | 2/4 | 6 | ¾ | 3/2 | 3/2 | 3/8 | 3 | 2:1 |
| 0/4 | ¼ | 6 | 3/16 | 7/4 | 7/4 | 3/16 | 9/2 | 4:3 |
| 0/4 | 0/4 | 6 | 0 | 2 | 2 | 0 | 6 | 1:1 |

*rotates in a converse direction
**corresponding numerals according to the present invention (ii) Reversing:
Please refer to FIG. 4E and Table 2. After the accelerator is pressed to the pre-determined extent and valve 230 is closed, one-fourth of the flow from pump 30 passes through pump 40, three-fourths of the flow from pump 30 enters pump 60 via oil paths 321, 320 and 315 to rotate pump 60 conversely. While in reverse, the engine crankshaft 3 meshes with the sun gear 112 of the first planetary gear 110 to rotate, for example, 4 cycles, while the planetary carrier 119 of the first planetary gear 110 connects with pump 30 to rotate 1 cycle in the same direction. The amount of flow of pump 30 is 4/4, wherein ¾ of the flow enters pump 60 to rotate pump 60 conversely and the remainder, ¼, flows to pump 40 to rotate pump 40 0.25 cycles conversely. Pump 40 connects with the planetary carrier 129 of the second planetary gear 120 to rotate the sun gear 122 of the second planetary gear 120 1 cycle conversely (which matches the converse rotating of 1 cycle of pump 60). Therefore, a reversing gear reduction ratio of 4:1 is obtained. If an overdrive with a gear reduction ratio of 0.75:1 is provided, the final gear reduction ratio is 3:1.

c. The First Embodiment 1 In Economical Control Type (i) Forwarding:
Please refer to Table 7. The gear reduction ratio of the automatic transmission and the flow within oil paths and pumps is listed below in Table 7, wherein the overdrive is not discussed.

TABLE 7

| control system (flow) | | first planetary gear (relative rotating speed) | | | second planetary gear (relative rotating speed) | | | gear reduction ratio |
|---|---|---|---|---|---|---|---|---|
| **540 | 510 | 12 | 16 & 30 * | 28 | 28 | 26 & 40 * | 200 * | |
| ¼ | ¾ | 6 | 2 | 0 | 0 | 0 | 0 | 6:0 |
| 0/4 | ¾ | 6 | 0 | 3/2 | 3/2 | 3/2 | 3/2 | 4:1 |
| 0/4 | 2/4 | 6 | 0 | 3/2 | 3/2 | 1 | 3 | 2:1 |
| 0/4 | ¼ | 6 | 0 | 3/2 | 3/2 | ½ | 9/2 | 4:3 |
| 0/4 | 0/4 | 6 | 0 | 3/2 | 3/2 | 0 | 6 | 1:1 |

The above gear reduction ratios are for an economical control type provided without economical starting.
The gear reduction ratios listed below are for an economical control type provided with economical starting.

| ¼ | 2/4 | 6 | 2 | 0 | 0 | 0 | 0 | 6:0 |
| 0/4 | 2/4 | 6 | 0 | 3/2 | 3/2 | 1 | 3 | 2:1 |
| 0/4 | ¼ | 6 | 0 | 3/2 | 3/2 | ½ | 9/2 | 4:3 |
| 0/4 | 0/4 | 6 | 0 | 3/2 | 3/2 | 0 | 6 | 1:1 |

*rotates in a converse direction
**corresponding numerals according to the present invention (ii) Reversing:
Please refer to FIG. 5E and Table 3. While in reverse, after the accelerator is pressed to the pre-determined extent and valve 540 is closed, if the engine crankshaft 3 meshes with the sun gear 12 of the first planetary gear 10 to rotate, for example, 4 cycles, the ring gear 16 of the first planetary gear 10 connects with pump 30 to rotate 1.33 cycles conversely. The amount of flow of pump 30 is 1.33 cycles * ¼ per cycle = 1.33/4. Therefore, pump 40 rotates 0.33 cycles in response to the flow. The ring gear 26 of the second planetary gear 20 rotates 0.33 cycles to rotate the sun gear 22 of the second planetary 20 1 cycle conversely. Therefore, a reversing gear reduction ratio of 4:1 is obtained. If an overdrive with a gear reduction ratio of 0.75:1 is provided, the final gear reduction ratio is 3:1.

d. The Second Embodiment 2 In Economical Control Type (i) Forwarding:
Please refer to Table 8. The gear reduction ratio of the automatic transmission and the flows within oil paths and pumps is listed below in Table 8, wherein the overdrive is not discussed.

TABLE 8

| control system (flow) | | first planetary gear (relative rotating speed) | | | second planetary gear (relative rotating speed) | | | gear reduction ratio |
|---|---|---|---|---|---|---|---|---|
| **540 | 510 | 112 | 119 & 30 * | 116 | 116 | 129 & 40 * | 122 | |
| ¼ | ¾ | 6 | 3/2 | 0 | 0 | 0 | 0 | 6:0 |
| 0/4 | ¾ | 6 | 0 | 2 | 2 | 9/8 | 3/2 | 4:1 |
| 0/4 | 2/4 | 6 | 0 | 2 | 2 | ¾ | 3 | 2:1 |
| 0/4 | ¼ | 6 | 0 | 2 | 2 | 3/8 | 9/2 | 4:3 |
| 0/4 | 0/4 | 6 | 0 | 2 | 2 | 0 | 6 | 1:1 |

The above gear reduction ratios are for an economical control type provided without economical starting.
The gear reduction ratios listed below are for an economical control type provided with economical starting.

| ¼ | 2/4 | 6 | 3/2 | 0 | 0 | 0 | 0 | 6:0 |
| 0/4 | 2/4 | 6 | 0 | 2 | 2 | ¾ | 3 | 2:1 |
| 0/4 | ¼ | 6 | 0 | 2 | 2 | 3/8 | 9/2 | 4:3 |
| 0/4 | 0/4 | 6 | 0 | 2 | 2 | 0 | 6 | 1:1 |

*rotates in a converse direction
**corresponding numerals according to the present invention (ii) Reversing:
Please refer to FIG. 6E and Table 4. While in reverse, after the accelerator is pressed to the pre-determined extent and valve 540 is closed, if the engine crankshaft 3 meshes with sun gear 112 of the first planetary gear 110 to rotate, for example, 4 cycles, the planetary carrier 119 connects with pump 30 to rotate 1 cycle in the same direction. The amount of flow of pump 30 is 1 cycle * ¼ per cycle = ¼. Therefore, pump 40 rotates 0.25 cycles conversely in response to the flow. The planetary carrier 129 of the second planetary gear 120 rotates 0.25 cycle conversely to rotate the sun gear 122 of the second planetary 120 1 cycle conversely. Therefore, a reversing gear reduction ratio of 4:1 is obtained. If an overdrive with a gear reduction ratio of 0.75:1 is provided, the final gear reduction ratio is 3:1.

If the apparatus is provided on a motorcycle in which the reversing function is not needed, pump 30 may be removed therefrom and pump 40 only is utilized. Furthermore, in both embodiments, the braking member in the first planetary gear is permanently fixed on the gear box with the provision of the oil pipes of FIGS. 5 and 6. Additionally, oil paths 412 and 413 are communicated to pump 40 directly with the corresponding valves 530, 540 and 150 provided therein and the desired dimensions of each oil path depends on the practical necessity. Also, the braking member of the second planetary gear can be fixed onto the gear box instead of fixing unto the first planetary gear.

When the apparatus according to the present invention is utilized in an industry, securing pump 60 is not required. Either of the braking members of the first or the second planetary gears is selected (depending on the user's will) to be permanently fixed. The braking member of the planetary gear which is not fixed is provided with a braking pump, a manually operable flow control valve, a relief valve and a check valve for a stepless automatic transmission.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An apparatus for providing an automatic transmission of a car comprising a first planetary gear (10; 110) and a second planetary gear (20; 120), a first braking pump (30) and a second braking pump (40), sensing means mounted on a rear propeller shaft (4) for sensing rotation speed of said rear propeller shaft (4), an oil path system and a first flow control valve (210; 510) provided on said oil path system, characterized in that: each of said first and second planetary gears (10, 20; 110, 120) has a sun gear (12, 22; 112, 122), a planet carrier (28; 119, 129) and a ring gear (16, 26; 116) which are accommodated to function as either a driving member, a driven member or a braking member of said first planetary gear (10; 110) and said second planetary gear (20; 120), wherein the driven member in said second planetary gear (20; 120) relates to the corresponding driving member in said first planetary gear (10; 110), the driving member in said second planetary gear (20; 120) relates to the corresponding driven member in said first planetary gear (10; 110), the braking member in said second planetary gear (20; 120) relates to the corresponding braking member in said first planetary gear (10; 110), said driving member of said first planetary gear (10; 110) is mounted on an engine crankshaft (3) and said driven member of said second planetary gear (20; 120) is mounted on said rear propeller shaft (4), a first rotor shaft (32) of said first braking pump (30) is connected to said braking member of said first planetary gear (10; 110), a second rotor shaft (42) of said second braking pump (40) is connected to said braking member of said second planetary gear (20; 120), both said first braking pump (30) and said second braking pump (40) are communicated to said oil path system and controlled by said sensing means; and said sensing means outputting predetermined amounts of pressurized working fluid responsive to said rotation speed of said rear propeller shaft (4) to close said first flow control valve (210; 510) so as to brake said first and second braking pumps (30, 40) via said oil path system, said braking members of said first and second planetary gears (10, 20; 110, 120) being braked by said first and second braking pumps (30, 40) and a continuously variable transmission is obtained.

2. An apparatus according to claim 1, wherein said sun gear (12) of said first planetary gear (10) functions as the driving member, said planet carrier (28) of said first planetary gear (10) functions as the driven member, said ring gear (16) of said first planetary gear (10) functions as the braking member, said sun gear (22) of said second planetary gear (20) functions as the driven member, said planet carrier (28) of said second planetary gear (20) functions as the driving member, said ring gear (26) of said second planetary gear (20) functions as the braking member;

a planet pinion (14) of said first planetary gear (10) shares a planet pinion shaft (18) and said planet carrier (28) of said first and second planetary gears with a planet pinion (24) of said second planetary gear (20), said sun gear (12) of said first planetary gear (10) is mounted on said engine crankshaft (3), said ring gear (16) of said first planetary gear (10) is connected to said first rotor shaft (32) of said first braking pump (30) via a first ring gear carrier (34), said ring gear (26) of said second planetary gear (20) is connected to said second rotor shaft (42) of said second braking pump (40) via a second ring gear carrier (44), said sun gear (22) of said second planetary gear (20) is mounted on said rear propeller shaft (4), said sensing means is a centrifugal oil pump (50) provided on said rear propeller shaft (4) for sensing the rotation speed of said rear propeller shaft (4);

a first end of a first oil path (301) is communicated to an outlet of said first braking pump (30), a first end of a second oil path (302) is communicated to a second end of said first oil path (301), a first end of a third oil path (303) is communicated to a second end of said second oil path (302), a second end of said third oil path (303) is communicated to an inlet of said second braking pump (40), a first end of a fourth oil path (304) is communicated to an outlet of said second braking pump (40), a first end of a fifth oil path (305) is communicated to a second end of said fourth oil path (304), a first end of a sixth oil path (306) is communicated to a second end of said fifth oil path (305), a second end of said sixth oil path (306) is communicated to an inlet of said first braking pump (30); and said first flow control valve (210) is provided on said second oil path (302), said first flow control valve (210) is communicated to said centrifugal oil pump (50) at one end thereof, said first flow control valve (210) is closed to various extents by said centrifugal oil pump (50).

3. An apparatus according to claim 2, further comprising a seventh oil path (307) communicated to said second end of said first oil path (301) at a first end thereof, a first end of an eighth oil path (308) being communicated to said first end of said sixth oil path (306), a first end and a second end of a ninth oil path (309) being respectively communicated to a second end of said seventh oil path (307) and a second end of said eighth oil path (308), a first end and a second end of a tenth oil path (310) being respectively communicated to said seventh oil path (307) and said eighth oil path (308), a first end and a second end of an eleventh oil path (311) being respectively communicated to said seventh oil path (307) and said eighth oil path (308);

a second flow control valve (220) for neutral being provided on said eleventh oil path (311), said second flow control valve (220) being opened when a shifting lever of the car is at a neutral position, said second flow control valve (220) being closed when the shifting lever is not at the neutral position;

a third flow control valve (230) being provided on said ninth oil path (309) and said tenth oil path (310), said third flow control valve (230) having dual gates (236, 237) to simultaneously open or close said ninth oil path (309) and said tenth oil path (310), said third flow control valve (230) being closed if an accelerator of the car is pressed to a predetermined extent; and a fourth flow control valve (240) for reversing under idling being provided on said ninth oil path (309) between said second end of said seventh oil path (307) and said third flow control valve (230), said fourth flow control valve (240) being opened when the shifting lever is at a reversing position, said fourth flow control valve (240) being closed when the shifting lever is not at the reversing position.

4. An apparatus according to claim 3, further comprising a braking annular gear (48) mounted on said planet pinion shaft (18), said braking annular gear (48) cooperating with a braking claw (46) mounted on an inner wall of a gear box which encloses said first and second planetary gears (10, 20) to fix said planet pinion shaft (18) during reversing.

5. An apparatus according to claim 4, further comprising a fifth flow control valve (250) for overdrive, said fifth flow control valve (250) being provided on a twelfth oil path (312) which is communicated to said second oil path (302) at two ends thereof, said fifth flow control valve (250) being communicated to said centrifugal oil pump (50) at one end thereof and functioning as said first flow control valve (210), said fifth flow control valve (250) starting to function only when the car has reached a pre-set overdrive speed.

6. An apparatus according to claim 4, further comprising a sixth flow control valve (260) for economical starting, said sixth flow control valve (260) being provided on a thirteenth oil path (313) which communicated to said second oil path (302) at two ends thereof, said sixth flow control valve (260) being closed when the economical starting is desired.

7. An apparatus according to claim 4, further comprising a seventh flow control valve (270) for lowering a gear reduction ratio under urgent conditions, said seventh flow control valve (270) being provided on a fourteenth oil path (314) which communicated to said second oil path (302) at two ends thereof, said seventh flow control valve (270) being manually opened when the lowering of gear reduction ratio is needed under urgent conditions.

8. An apparatus according to claim 4, further comprising a securing oil pump (60) for engine braking, said securing pump (60) being mounted on said rear propeller shaft (4) via a rotor shaft (62) thereof, a first end of a fifteenth oil path (315) being communicated to a first end of said securing oil pump (60), a second end of said fifteenth oil path (315) being communicated to a first side of a split-directional flow control valve (200), a first end of a sixteenth oil path (316) being communicated to a second end of said securing oil pump (60), a second end of said sixteenth oil path 316) being communicated to a first end of a seventeenth oil path (317), a second end of said seventeenth oil path (317) is communicated to said second end of said fourth oil path (304), a first end of an eighteenth oil path (318) being communicated to a second side of said split-directional flow control valve (200), a second end of said eighteenth oil path (318) being communicated to said second end of said sixteenth oil path (316), a nineteenth oil path (319) being communicated to said eighteenth oil path (318) at two ends thereof, a first end of'a twentieth oil path (320) being communicated to said second side of said split-directional flow control valve (200), a second end of said twentieth oil path (320) being communicated to said first end of said third oil path (303);

an eighth flow control valve (280) being provided on said nineteenth oil path (319), said eighth flow control valve (280) being opened when the shifting lever is at the neutral position, said eighth flow control valve (280) being closed when the shifting lever is not at the neutral position, a check valve (170) being provided on said eighteenth oil path (318) between said two ends of said nineteenth oil path (319), the flow within said eighteenth oil path (318) being restrained that the working fluid is only flowable from said first end of said eighteenth oil path (318) to said second end of said eighteenth oil path (318);

a ninth flow control valve (290) being provided on said sixteenth oil path (316) for braking when a braking system of the car is not functioning properly, said ninth flow control valve (290) being closed when the braking system is not functioning properly and a braking pedal of the braking system is pressed and passes over a clearance between the braking pedal and a floor of the car;

said split-directional flow control valve (200) being arranged so that a total amount of flow of said eighteenth oil path (318) and said twentieth oil path (320) is the same as the flow of said fifteenth oil path (315), said eighteenth oil path (318) being opened and said twentieth oil path (320) being closed when the shifting lever is at a forwarding position, said eighteenth oil path (318) being closed and said twentieth oil path (320) being opened when the shifting lever is at the reversing position, said split-directional flow control valve (200) being manually operable to partially close both said eighteenth oil path (318) and said twentieth oil path (320) for driving at a rated speed; and a tenth flow control valve (300) for reversing, said tenth flow control valve (300) being provided on a twenty-first oil path (321), a first end of said twenty-first oil path (321) being communicated to said second end of said first oil path (301), a second end of said twenty-first oil path (321) being communicated to said twentieth oil path (320), said tenth flow control valve (300) being opened when the shifting lever is at the reversing position, said tenth flow control valve (300) being closed when the shifting lever is not at the reversing position.

9. An apparatus according to claim 1, wherein said sun gear (112) of said first planetary gear (110) functions as the driving member, said planet carrier (119) of said first planetary gear (110) functions as the braking member, said ring gear (116) of said first planetary gear (110)

functions as the driven member, said sun gear (122) of said second planetary gear (120) functions as the driven member, said planet carrier (129) of said second planetary gear (120) functions as the braking member, said ring gear (116) of said second planetary gear (120) functions as the driving member;

said ring gear of said first planetary gear (110) is integrally formed with said ring gear of said second planetary gear (120), said sun gear (112) of said first planetary gear (110) is mounted on said engine crankshaft (3), said planet carrier (119) of said first planetary gear (110) is connected to said first rotor shaft (32) of said first braking pump (30), said planet carrier (129) of said second planetary gear (120) is connected to said second rotor shaft (42) of said second braking pump (40), said sun gear (122) of said second planetary gear (120) is mounted on said rear propeller shaft (4), said sensing means is a centrifugal oil pump (50) provided on said rear propeller shaft (4) for sensing the rotation speed of said rear propeller shaft (4);

a first end of a first oil path (301) is communicated to an outlet of said first braking pump (30), a first end of a second oil path (302) is communicated to a second end of said first oil path (301), a first end of a third oil path (303) is communicated to a second end of said second oil path (302), a second end of said third oil path (303) is communicated to an inlet of said second braking pump (40), a first end of a fourth oil path (304) is communicated to an outlet of said second braking pump (40), a first end of a fifth oil path (305) is communicated to a second end of said fourth oil path (304), a first end of a sixth oil path (306) is communicated to a second end of said fifth oil path (305), a second end of said sixth oil path (306) is communicated to an inlet of said first braking pump (30); and said first flow control valve (210) is provided on said second oil path (302), said first flow control valve (210) is communicated to said centrifugal oil pump (50) at one end thereof, said first flow control valve (210) is closed to various extents by said centrifugal oil pump (50).

10. An apparatus according to claim 9, further comprising a seventh oil path (307) communicated to said second end of said first oil path (301) at a first end thereof, a first end of an eighth oil path (308) being communicated to said first end of said sixth oil path (306), a first end and a second end of a ninth oil path (309) being respectively communicated to a second end of said seventh oil path (307) and a second end of said eighth oil path (308), a first end and a second end of a tenth oil path (310) being respectively communicated to said seventh oil path (307) and said eighth oil path (308), a first end and a second end of an eleventh oil path (311) being respectively communicated to said seventh oil path (307) and said eighth oil path (308);

a second flow control valve (220) for neutral being provided on said eleventh oil path (311), said second flow control valve (220) being opened when a shifting lever of the car is shifted to a neutral position, said second flow control valve (220) being closed when the shifting lever is not at the neutral position;

a third flow control valve (230) being provided on said ninth oil path (309) and said tenth oil path (310), said third flow control valve (230) having dual gates (236, 237) to simultaneously open or close said ninth oil path (309) and said tenth oil path (310), said third flow control valve (230) being closed if an accelerator of the car is pressed to a predetermined extent; and a fourth flow control valve (240) for reversing under idling conditions being provided on said ninth oil path (309) between said second end of said seventh oil path (307) and said third flow control valve (230), said fourth flow control valve (240) being opened when the shifting lever is at a reversing position, said fourth flow control valve (240) being closed when the shifting lever is not at the reversing position.

11. An apparatus according to claim 10, further comprising a braking annular gear (48) mounted on an outer periphery of said integral ring gear (116), said braking annular gear (48) cooperating with a braking claw (46) mounted on an inner wall of a gear box which encloses said first and second planetary gears (110, 120) to fix said integral ring gear (116) during reversing.

12. An apparatus according to claim 11, further comprising a fifth flow control valve (250) for overdrive, said fifth flow control valve (250) being provided on a twelfth oil path (312) which communicated to said second oil path (302) at two ends thereof, said fifth flow control valve (250) being communicated to said centrifugal oil pump (50) at one end thereof and functioning as said first flow control valve (210), said fifth flow control valve (250) starting to function when the car has reached a pre-set overdrive speed.

13. An apparatus according to claim 11, further comprising a sixth flow control valve (260) for economical starting, said sixth flow control valve (260) being provided on a thirteenth oil path (313) which communicated to said second oil path (302) at two ends thereof, said sixth flow control valve (260) being closed when the economical starting is desired.

14. An apparatus according to claim 11, further comprising a seventh flow control valve (270) for lowering a gear reduction ratio under urgent conditions, said seventh flow control valve (270) being provided on a fourteenth oil path (314) which communicates to said second oil path (302) at two ends thereof, said seventh flow control valve (270) being manually opened when the lowering of gear reduction ratio is needed under urgent conditions.

15. An apparatus according to claim 11, further comprising a securing oil pump (60) for engine braking, said securing pump (60) being mounted on said rear propeller shaft (4) via a rotor shaft (62) thereof, a first end of a fifteenth oil path (315) being communicated to a first end of said securing oil pump (60), a second end of said fifteenth oil path (315) being communicated to a first side of a split-directional flow control valve (200), a first end of a sixteenth oil path (316) being communicated to a second end of said securing oil pump (60), a second end of said sixteenth oil path (316) being communicated to a first end of a seventeenth oil path (317), a second end of said seventeenth oil path (317) is communicated to said second end of said fourth oil path (304), a first end of an eighteenth oil path (318) being communicated to a second side of said split-directional flow control valve (200), a second end of said eighteenth oil path (318) being communicated to the second end of said sixteenth oil path (316), a nineteenth oil path (319) being communicated to said eighteenth oil path (318) at two ends thereof, a first end of a twentieth oil path (320) being communicated to said second side of said split-directional flow control valve (200), a second end of said twentieth oil path (320) being communicated to said first end of said third oil path (303);

an eighth flow control valve (280) being provided on said nineteenth oil path (319), said eighth flow control valve (280) being opened when the shifting lever is at the neutral position, said eighth flow control valve (280) being closed when the shifting lever is not at the neutral position, a check valve (170) being provided on said eighteenth oil path (318) between said two ends of said nineteenth oil path (319), the flow within said eighteenth oil path (318) being restrained so that the working fluid is only flowable from said first end of said eighteenth oil path (318) to said second end of said eighteenth oil path (318);

a ninth flow control valve (290) being provided on said sixteenth oil path (316) for braking when a braking system of the car is not functioning properly, said ninth flow control valve (290) being closed when the braking system is not functioning properly and a braking pedal of the braking system is pressed and passes over a clearance between the braking pedal and a floor of the car;

said split-directional flow control valve (200) being arranged so that a total amount of flow of said eighteenth oil path (318) and said twentieth oil path (320) is the same as the flow of said fifteenth oil path (315), said eighteenth oil path (318) being opened and said twentieth oil path (320) being closed when the shifting lever is at a forwarding position, said eighteenth oil path (318) being closed and said twentieth oil path (320) being opened when the shifting lever is at the reversing position, said split-directional flow control valve (200) being manually operable to partially close both said eighteenth oil path (318) and said twentieth oil path (320) for driving at a rated speed; and a tenth flow control valve (300) for reversing, said tenth flow control valve (300) being provided on a twenty-first oil path (321), a first end of said twenty-first oil path (321) being communicated to said second end of said first oil path (301), a second end of said twenty-first oil path (321) being communicated to said twentieth oil path (320), said tenth flow control valve (300) being opened when the shifting lever is at the reversing position, said tenth flow control valve (300) being closed when the shifting lever is not at the reversing position.

16. An apparatus according to claim 1, wherein said sun gear (12) of said first planetary gear (10) functions as the driving member, said planet carrier (28) of said first planetary gear (10) functions as the driven member, said ring gear (16) of said first planetary gear (10) functions as the braking member, said sun gear (22) of said second planetary gear (20) functions as the driven member, said planet carrier (28) of said second planetary gear (20) functions as the driving member, said ring gear (26) of said second planetary gear (20) functions as the braking member;

a planet pinion (14) of said first planetary gear (10) shares a planet pinion shaft (18) and said planet carrier (28) of said first and second planetary gears with a planet pinion (24) of said second planetary gear (20), said sun gear (12) of said first planetary gear (10) is mounted on said engine crankshaft (3), said ring gear (16) of said first planetary gear (10) is connected to said first rotor shaft (32) of said first braking pump (30) via a first ring gear carrier (34), said ring gear (26) of said second planetary gear (20) is connected to said second rotor shaft (42) of said second braking pump (40) via a second ring gear carrier (44), said sun gear (22) of said second planetary gear (20) is mounted on said rear propeller shaft (4), said sensing means is a centrifugal oil pump (50) provided on said rear propeller shaft (4) for sensing the rotation speed of said rear propeller shaft (4);

a first end of a first oil path (401) is communicated to an outlet of said first braking pump (30), a first end of a second oil path (402) is communicated to a second end of said first oil path (401), a first end of a third oil path (403) is communicated to a second end of said second oil path (402), a second end of said third oil path (403) is communicated to an inlet of said second braking pump (40), a first end of a fourth oil path (404) is communicated to an outlet of said second braking pump (40), a first end of a fifth oil path (405) is communicated to a second end of said fourth oil path (404), a first end of a sixth oil path (46) is communicated to a second end of said fifth oil path (405), a second end of said sixth oil path (406) is communicated to an inlet of said first braking pump (30);

a first end of a seventh oil path (407) is communicated to said first end of said third oil path (403), a first end of an eighth oil path (408) is communicated to said second end of said fourth oil path (404), a ninth oil path (409) is communicated to a second end of said seventh oil path (407) and a second end of said eighth oil path (408) at two ends thereof;

said first flow control valve (510) is provided on said ninth oil path (409), said first flow control valve (510) is communicated to said centrifugal oil pump (50) at one end thereof, said first flow control valve (510) is closed in various extents by said centrifugal oil pump (50); and a second flow control valve (520) for reversing is provided on said second oil path (402), said second flow control valve (520) is opened when a shifting lever of the car is at a reversing position, said second flow control valve (520) is closed when the shifting lever is not at the reversing position.

17. An apparatus according to claim 16, further comprising a braking valve (600) mounted on an inner wall of a gear box which encloses said first and second planetary gears (10, 20), said braking valve (600) being communicated to said centrifugal oil pump (50) at one end thereof, said braking valve (600) being engaged with an annular ratchet (610) provided on an outer periphery of said ring gear (16) of said first planetary gear (10) when said centrifugal oil pump (50) outputs working fluid in response to said rotation speed of said rear propeller shaft (4).

18. An apparatus according to claim 17, further comprising a braking annular gear (48) mounted on said planet pinion shaft (18), said braking annular gear (48) cooperating with a braking claw (46) mounted on said inner wall of the gear box to fix said planet pinion shaft (18) during reversing.

19. An apparatus according to claim 18, further comprising a tenth oil path (410) communicated to said second end of said first oil path (401) at a first end thereof, a first end of an eleventh oil path (411) being communicated to said first end of said sixth oil path (406), a first end and a second end of a twelfth oil path (412) being respectively communicated to a second end of said tenth oil path (410) and a second end of said eleventh oil path (411), a thirteenth oil path (413) being communicated to said tenth oil path (410) and said eleventh oil path (411) at two ends thereof;

- a third flow control valve (530) for neutral being provided on said thirteenth oil path (413), said third flow control valve (530) being opened when the shifting lever is at a neutral position, said third flow control valve (530) being closed when the shifting lever is not at the neutral position; and
- a fourth control valve (540) being provided on said twelfth oil path (412), said fourth flow control valve (540) being closed if an accelerator of the car is pressed to a pre-determined extent.

20. An apparatus according to claim 19, further comprising a fifth flow control valve (550) for overdrive, said fifth flow control valve (550) being provided on a fourteenth oil path (414) which communicated to said ninth oil path (409) at two ends thereof, said fifth flow control valve (550) being communicated to said centrifugal oil pump (50) at one end thereof and functioning as said first flow control valve (510), said fifth flow control valve (550) starting to function when the car has reached a pre-set overdrive speed.

21. An apparatus according to claim 19, further comprising a sixth flow control valve (560) for economical starting, said sixth flow control valve (560) being provided on a fifteenth oil path (415) which is communicated to said ninth oil path (409) at two ends thereof, said sixth flow control valve (560) being closed when the economical starting is desired.

22. An apparatus according to claim 19, further comprising a seventh flow control valve (570) for lowering a gear reduction ratio under urgent conditions, said seventh flow control valve (570) being provided on a sixteenth oil path (416) which communicated to said ninth oil path (409) at two ends thereof, said seventh flow control valve (570) being manually opened when the lowering of gear reduction ratio is needed for urgent conditions.

23. An apparatus according to claim 19, further comprising a securing oil pump (60) for engine braking, a first end of a seventeenth oil path (417) being communicated to a first end of said securing oil pump (60), a second end of said seventeenth oil path (417) being communicated to a first side of a split-directional flow control valve (200), a first end of an eighteenth oil path (418) being communicated to a second side of said split-directional flow control valve (200), a second end of said eighteenth oil path (418) being communicated to the second end of said seventh oil path (407), a first end of a nineteenth oil path (419) being communicated to a second end of said securing oil pump (60), a second end of said nineteenth oil path (419) being communicated to a first end of a twentieth oil path (420), a second end of said twentieth oil path (420) being communicated to said second end of said eighth oil path (408), a first end of a twenty-first oil path (421) being communicated to said second side of said split-directional flow control valve (200), a second end of said twenty-first oil path (421) being communicated to said second end of said nineteenth oil path (419), a twenty-second oil path (422) being communicated to said twenty-first oil path (421) at two ends thereof;

an eighth flow control valve (580) being provided on said twenty-second oil path (422), said eighth flow control valve (580) being opened when the shifting lever is at the neutral position or reversing position, said eighth flow control valve (580) being closed when the shifting lever is neither at the neutral position nor at the reversing position, a check valve (170) being provided on said twenty-first oil path (421) between said two ends of said twenty-second oil path (422), the flow within said twenty-first oil path (421) being restrained so that the working fluid is only flowable from said first end of said twenty-first oil path (421) to said second end of said twenty-first oil path (421);

a ninth flow control valve (590) being provided on said nineteenth oil path (419) for braking when a braking system of the car is not functioning properly, said ninth flow control valve (590) being closed when the braking system is not functioning properly and a braking pedal of the braking system is pressed and passes over a clearance between the braking pedal and a floor of the car; and said split-directional flow control valve (200) being arranged that a total amount of flow of said eighteenth oil path (418) and said twenty-first oil path (421) is the same as the flow of said seventeenth oil path (417), said eighteenth oil path (418) being closed and said twenty-first oil path (421) being opened when the shifting lever is at a forwarding position or the reversing position, said split-directional flow control valve (200) being manually operable to partially close both said eighteenth oil path (418) and said twenty-first oil path (421) for driving at a rated speed.

24. An apparatus according to claim 1, wherein said sun gear (112) of said first planetary gear (110) functions as the driving member, said planet carrier (119) of said first planetary gear (110) functions as the braking member, said ring gear (116) of said first planetary gear (110) functions as the driven member, said sun gear (122) of said second planetary gear (120) functions as the driven member, said planet carrier (129) of said second planetary gear (120) functions as the braking member, said ring gear (116) of said second planetary gear (120) functions as the driving member;

said ring gear of said first planetary gear (110) is integrally formed with said ring gear of said second planetary gear (120), said sun gear (112) of said first planetary gear (110) is mounted on said engine crankshaft (3), said planet carrier (119) of said first planetary gear (110) is connected to said first rotor shaft (32) of said first braking pump (30), said planet carrier (129) of said second planetary gear (120) is connected to said second rotor shaft (42) of said second braking pump (40), said sun gear (122) of said second planetary gear (120) is mounted on said rear propeller shaft (4), said sensing means is a centrifugal oil pump (50) provided on said rear propeller shaft (4) for sensing the rotation speed of said rear propeller shaft (4);

a first end of a first oil path (401) is communicated to an outlet of said first braking pump (30), a first end of a second oil path (402) is communicated to a second end of said first oil path (401), a first end of a third oil path (403) is communicated to a second end of said second oil path (402), a second end of said third oil path (403) is communicated to an inlet of said second braking pump (40), a first end of a fourth oil path (404) is communicated to an outlet of said second braking pump (40), a first end of a fifth oil path (405) is communicated to a second end of said fourth oil path (404), a first end of a sixth oil path (406) is communicated to a second end of said fifth oil path (405), a second end of said sixth oil path (406) is communicated to an inlet of said first braking pump (30);

a first end of a seventh oil path (407) is communicated to said first end of said third oil path (403), a first end of an eighth oil path (408) is communicated to said second end of said fourth oil path (404), a ninth oil path (409) is communicated to a second end of said seventh oil path (407) and a second end of said eighth oil path (408) at two ends thereof;

said first flow control valve (510) is provided on said ninth oil path (409), said first flow control valve (510) is communicated to said centrifugal oil pump (50) at one end thereof, said first flow control valve (510) is closed in various extents by said centrifugal oil pump (50); and a second flow control valve (520) for reversing is provided on said second oil path (402), said second flow control valve (520) is opened when a shifting lever of the car is at a reversing position, said second flow control valve (520) is closed when the shifting lever is not at the reversing position.

25. An apparatus according to claim 24, further comprising a braking valve (600) mounted on an inner wall of a gear box which encloses said first and second planetary gears (10, 20), said braking valve (600) being communicated to said centrifugal oil pump (50) at one end thereof, said braking valve (600) being engaged with an annular ratched (610) provided on an outer periphery of an extension of said planet carrier (119) of said first planetary gear (110) when said centrifugal oil pump (50) outputs working fluid in response to said rotation speed of said rear propeller shaft (4).

26. An apparatus according to claim 25, further comprising a braking annular gear (48) mounted on an outer periphery of said integral ring gear (116), said braking annular gear (48) cooperating with a braking claw (46) mounted on said inner wall of the gear box to fix said integral ring gear (116) during reversing.

27. An apparatus according to claim 26, further comprising a tenth oil path (410) communicated to said second end of said first oil path (401) at a first end thereof, a first end of an eleventh oil path (411) being communicated to said first end of said sixth oil path (406), a first end and a second end of a twelfth oil path (412) being respectively communicated to a second end of said tenth oil path (410) and a second end of said eleventh oil path (411), a thirteenth oil path (413) being communicated to said tenth oil path (410) and said eleventh oil path (411) at two ends thereof;

a third flow control valve (530) for neutral being provided on said thirteenth oil path (413), said third flow control valve (530) being opened when the shifting lever is at a neutral position, said third flow control valve (530) being closed when the shifting lever is not at the neutral position; and a fourth flow control valve (540) being provided on said twelfth oil path (412), said fourth flow control valve (540) being closed if an accelerator of the car is pressed to a pre-determined extent.

28. An apparatus according to claim 27, further comprising a fifth flow control valve (550) for overdrive, said fifth flow control valve (550) being provided on a fourteenth oil path (414) which communicated to said ninth oil path (409) at two ends thereof, said fifth flow control valve (550) being communicated to said centrifugal oil pump (50) at one end thereof and functioning as said first control valve (510), said fifth flow control valve (550) starting to function when the car has reached a pre-set overdrive speed.

29. An apparatus according to claim 27, further comprising a sixth flow control valve (560) for economical starting, said sixth flow control valve (560) being provided on a fifteenth oil path (415) which is communicated to said ninth oil path (409) at two ends thereof, said sixth flow control valve (560) being closed when the economical starting is desired.

30. An apparatus according to claim 27, further comprising a seventh flow control valve (570) for lowering a gear reduction ratio under urgent conditions, said seventh flow control valve (570) being provided on a sixteenth oil path (416) which communicated to said ninth oil path (409) at two ends thereof, said seventh flow control valve (570) being manually opened when the lowering of gear reduction ratio is needed under urgent conditions.

31. An apparatus according to claim 27, further comprising a securing oil pump (60) for engine braking, a first end of a seventeenth oil path (417) being communicated to a first end of said securing oil pump (60), a second end of said seventeenth oil path (417) being communicated to a first side of a split-directional flow control valve (200), a first end of an eighteenth oil path (418) being communicated to a second side of said split-directional flow control valve (200), a second end of said eighteenth oil path (418) being communicated to said second end of said seventh oil path (407), a first end of a nineteenth oil path (419) being communicated to a second end of said securing oil pump (60), a second end of said nineteenth oil path (419) being communicated to a first end of a twentieth oil path (420), a second end of said twentieth oil path (420) being communicated to said second end of said eighth oil path (408), a first end of a twenty-first oil path (421) being communicated to said second side of said split-directional flow control valve (200), a second end of said twenty-first oil path (421) being communicated to said second end of said nineteenth oil path (419), a twenty-second oil path (422) being communicated to said twenty-first oil path (421) at two ends thereof;

an eighth flow control valve (580) being provided on said twenty-second oil path (422), said eighth flow control valve (580) being opened when the shifting lever is at the neutral position or reversing position, said eighth flow control valve (580) being closed when the shifting lever is neither at the neutral position nor at the reversing position, a check valve (170) being provided on said twenty-first oil path (421) between said two ends of said twenty-second oil path (422), the flow within said twenty-first oil path (421) being restrained that the working fluid is only flowable from said first end of said twenty-first oil path (421) to said second end of said twenty-first oil path (421);

a ninth flow control valve (590) being provided on said nineteenth oil path (419) for braking when a braking system of the car is not functioning properly, said ninth flow control valve (590) being closed when the braking system is not functioning properly and a braking pedal of the braking system is pressed and passes over a clearance between the braking pedal and a floor of the car; and said split-directional flow control valve (200) being arranged that a total amount of flow of said eighteenth oil path (418) and said twenty-first oil path (421) is the same as the flow of said seventeenth oil path (417), said eighteenth oil path (418) being closed and said twenty-first oil path (421) being opened when the shifting lever is at a forwarding position or the reversing position, said split-directional flow control valve (200) being manually operable to partially close both said eighteenth oil path (418) and twenty-first oil path (421) for driving at a rated speed.

* * * * *